(12) United States Patent
Kim et al.

(10) Patent No.: US 12,429,977 B2
(45) Date of Patent: Sep. 30, 2025

(54) SENSOR DEVICE AND DISPLAY DEVICE INCLUDING THE SAME

(71) Applicant: Samsung Display Co., LTD., Yongin-si (KR)

(72) Inventors: Jin Woo Kim, Yongin-si (KR); Ja Seung Ku, Yongin-si (KR); Chang Bum Kim, Yongin-si (KR); Dong Chun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 266 days.

(21) Appl. No.: 18/189,927

(22) Filed: Mar. 24, 2023

(65) Prior Publication Data
US 2024/0077973 A1  Mar. 7, 2024

(30) Foreign Application Priority Data
Sep. 6, 2022  (KR) .................. 10-2022-0113093

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC ... G06F 3/04166; G06F 3/0418; G06F 3/0446
See application file for complete search history.

(56) References Cited

FOREIGN PATENT DOCUMENTS

| CN | 113900538 A | * | 1/2022 | ........... G06F 3/0412 |
|---|---|---|---|---|
| KR | 10-2007-0029816 A | | 3/2007 | |
| WO | WO 2006-012187 A1 | | 2/2006 | |

OTHER PUBLICATIONS

Machine translation of CN 113900538 (Year: 2025).*

* cited by examiner

*Primary Examiner* — Michael Pervan
(74) *Attorney, Agent, or Firm* — Womble Bond Dickinson (US) LLP

(57) ABSTRACT

A sensor device includes: a sensor panel including sensors arranged in a matrix form and sensor lines electrically connected to the sensors one-to-one; and a sensor driver configured to receive sensing signals from the sensors through the sensor lines, wherein the sensor driver is configured to simultaneously receive a first sensing signal from a first sensor using a first reference signal and a second sensing signal from a second sensor using a second reference signal, wherein the first reference signal and the second reference signal have a same waveform, a phase of the second reference signal is different from a phase of the first reference signal, and wherein a phase of the second sensing signal is different from a phase of the first sensing signal.

20 Claims, 23 Drawing Sheets

FIG. 7

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

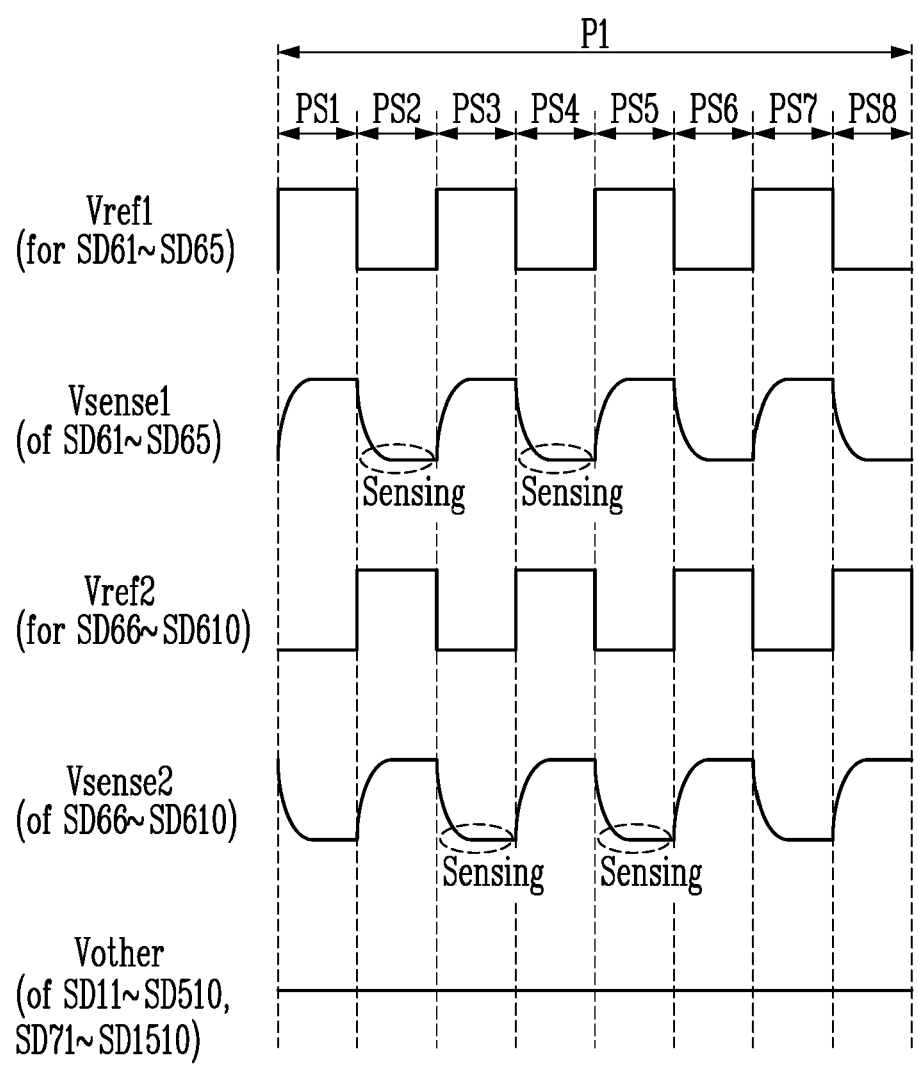

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

Labels (left, rows 4–8): VDRV1, SD_ADJ1, Vsense1, SD_G1, SD_ADJ1, VDRV1
Labels (right, cols 6–10): SD_ADJ2, VDRV2, SD_G2, Vsense2, VDRV2, SD_ADJ2

Regions: A1, A2
Axes: DR1, DR2
Reference: 120

SENSOR DEVICE AND DISPLAY DEVICE INCLUDING THE SAME

CROSS-REFERENCE TO RELATED APPLICATION

The present application claims priority to and the benefit of Korean Patent Application No. 10-2022-0113093, filed on Sep. 6, 2022, the entire content of which is incorporated herein by reference.

BACKGROUND

1. Field

Aspects of some embodiments of the present disclosure relate to a sensor driver and a display device including the same.

2. Description of the Related Art

As information technology develops, the importance of display devices, which provide a connection medium between a user and information, has been highlighted. In response to this, a use of display devices such as liquid crystal display devices and organic light emitting display devices is increasing.

Display devices may include a sensor device, may sense a touch of a user corresponding to an image of the display device, and may use the touch as an input signal. At this time, a driving signal supplied to sensors of the sensor device may act as noise to the display device, and thus display quality may be deteriorated. Conversely, signals for image display of the display device may act as noise to the sensor device, and thus sensing sensitivity may be reduced.

In order to avoid such electromagnetic interference (EMI), a method of changing a frequency band of the driving signal of the sensor device is proposed, but because various frequency bands are already used, finding an additional appropriate frequency band is a difficult problem.

The above information disclosed in this Background section is only for enhancement of understanding of the background and therefore the information discussed in this Background section does not necessarily constitute prior art.

SUMMARY

Aspects of some embodiments include a sensor device and a display device including the same that may be capable of minimizing or reducing EMI without changing a frequency band.

Characteristics of embodiments according to the present disclosure are not limited to the characteristics described above, and other technical characteristics which are not described will be more clearly understood by those skilled in the art from the following description.

According to some embodiments of the present disclosure, a sensor device includes a sensor panel including sensors arranged in a matrix form and sensor lines electrically connected to the sensors one-to-one, and a sensor driver configured to receive sensing signals from the sensors through the sensor lines. According to some embodiments, the sensor driver simultaneously receives a first sensing signal from a first sensor using a first reference signal and a second sensing signal from a second sensor using a second reference signal. According to some embodiments, the first reference signal and the second reference signal have the same waveform, a phase of the second reference signal is different from a phase of the first reference signal, and a phase of the second sensing signal is different from a phase of the first sensing signal.

According to some embodiments, the first reference signal and the second reference signal may be square waves, the phase of the second reference signal may be substantially opposite the phase of the first reference signal, and the phase of the second sensing signal may be substantially opposite to the phase of the first sensing signal.

According to some embodiments, the sensor panel may be divided into a first area in which the first sensor is positioned and a second area in which the second sensor is positioned, and the sensor driver may receive the sensing signals from the sensors of the first area using the first reference signal, and receive the sensing signals from the sensors of the second area using the second reference signal.

According to some embodiments, the sensor driver may receive the sensing signals from the sensors in a row unit for each area.

According to some embodiments, the first area and the second area may be divided based on a specific column.

According to some embodiments, while the sensor driver receives the first and second sensing signals from the first and second sensors, the second reference signal may not be applied to the sensors of the first area, and the first reference signal may not be applied to the sensors of the second area.

According to some embodiments, the first sensor and the second sensor may be included in the same row.

According to some embodiments, the first sensor and the second sensor may be included in different rows.

According to some embodiments, the sensor driver may include an amplifier including a first input terminal electrically connected to one sensor line among the sensor lines, a second input terminal to which the first reference signal or the second reference signal is applied, and an output terminal, and a capacitor and a switch electrically connected in parallel between the first input terminal and the output terminal of the amplifier, and a sensing signal according to the first reference signal or the second reference signal may be generated in the one sensor line among the sensor lines.

According to some embodiments, the sensors may include at least one first adjacent sensor included in the same column as the first sensor and adjacent to the first sensor, the sensor driver may apply a third reference signal to the at least one first adjacent sensor while receiving the first sensing signal, and a phase of the third reference signal may be the same as the phase of the first reference signal.

According to some embodiments, the sensors may include at least one second adjacent sensor included in the same column as the second sensor and adjacent to the second sensor, the sensor driver may apply a fourth reference signal to the at least one second adjacent sensor while receiving the second sensing signal, and a phase of the fourth reference signal may be the same as the phase of the second reference signal.

According to some embodiments, the first sensor, the second sensor, the at least one first adjacent sensor, and the at least one second adjacent sensor may be included in rows different from each other.

According to some embodiments, the sensor driver may sequentially scan the sensors along a diagonal direction crossing a row direction and a column direction.

According to some embodiments, the sensors may further include at least one third adjacent sensor included in the same row as the first sensor and adjacent to the first sensor, and the sensor driver may apply the third reference signal to the at least one third adjacent sensor while receiving the first sensing signal.

According to some embodiments, the sensor driver may sequentially scan the sensors along a diagonal direction crossing a row direction and a column direction.

According to some embodiments, the sensor driver may receive the sensing signals from the sensors in a row unit for each area.

According to some embodiments, the sensor driver may receive the sensing signals from the sensors in a row unit, receive the sensing signals from the sensors of an odd-numbered row using the first reference signal, and receive the sensing signals from the sensors of an even-numbered row using the second reference signal.

According to some embodiments of the present disclosure, a sensor device includes a sensor panel including sensors arranged in a matrix form and sensor lines electrically connected to the sensors one-to-one, a first sensor driver configured to receive first sensing signals from first sensors positioned in a first area of the sensor panel using a first reference signal, and a second sensor driver configured to receive second sensing signals from second sensors positioned in a second area of the sensor panel using a second reference signal. According to some embodiments, the first reference signal and the second reference signal have the same waveform, a phase of the second reference signal is different from a phase of the first reference signal, and a phase of the second sensing signals is different from a phase of the first sensing signals.

According to some embodiments, the phase of the second reference signal may be substantially opposite the phase of the first reference signal, and the phase of the second sensing signal may be substantially opposite to the phase of the first sensing signal.

According to some embodiments, the sensors may include first adjacent sensors adjacent to the first sensors, and second adjacent sensors adjacent to the second sensors, while receiving the first and second sensing signals, the first sensor driver may apply a third reference signal to the first adjacent sensors, and the second sensor driver may apply a fourth reference signal to the second adjacent sensors, a phase of the third reference signal may be the same as the phase of the first reference signal, and the phase of the fourth reference signal may be opposite to the phase of the third reference signal.

According to some embodiments of the present disclosure, a display device includes a display panel displaying an image, a sensor panel at least partially overlapping the display panel, and including sensors arranged in a matrix form, and sensor lines electrically connected to the sensors one-to-one, and a sensor driver configured to receive sensing signals from the sensors through the sensor lines. According to some embodiments, the sensor driver simultaneously receives a first sensing signal from a first sensor using a first reference signal and a second sensing signal from a second sensor using a second reference signal, the first reference signal and the second reference signal have the same waveform, a phase of the second reference signal is different from a phase of the first reference signal, and a phase of the second sensing signal is different from a phase of the first sensing signal.

According to some embodiments, the details of other embodiments are included in the detailed description and drawings.

According to some embodiments, the sensor device and the display device according to embodiments of the present disclosure may divide the sensor panel into the first and second areas, and may perform a sensing operation on each of the first and second areas simultaneously using the first and second reference signals having mutually reverse phases. Therefore, EMI may be reduced without changing a frequency band.

In addition, the sensor device and the display device according to some embodiments may apply first and second shield signals having mutually reverse phases (and the third and fourth reference signals having mutually reverse phases) to the first and second areas, respectively, to improve signal-to-noise ratio. Therefore, the sensor device and the display device may reduce a driving area of the sensor panel and power consumption corresponding thereto while reducing EMI without performance degradation.

An effect according to embodiments is not limited by the contents described above, and more various effects are included in the present specification.

BRIEF DESCRIPTION OF THE DRAWINGS

The above and other features of the disclosure will become more apparent by describing in further detail aspects of some embodiments thereof with reference to the accompanying drawings, in which:

FIG. 7 is a diagram illustrating aspects of an operation of the sensor device of FIG. 4 according to some embodiments;

FIGS. 8A and 8B are diagrams illustrating aspects of signals measured by the sensor device of FIG. 7 according to some embodiments;

FIG. 10 is a diagram illustrating aspects of the operation of the sensor device of FIG. 4 according to some embodiments;

FIG. 12 is a diagram illustrating aspects of the operation of the sensor device of FIG. 4 according to some embodiments;

FIG. 14 is a diagram illustrating aspects of the operation of the sensor device of FIG. 4 according to some embodiments;

FIG. 21 is a diagram illustrating aspects of an operation of the sensor device of FIG. 20 according to some embodiments; and FIG. 22 is a diagram illustrating aspects of the operation of the sensor device of FIG. 20 according to some embodiments.

DETAILED DESCRIPTION

Figure 1:
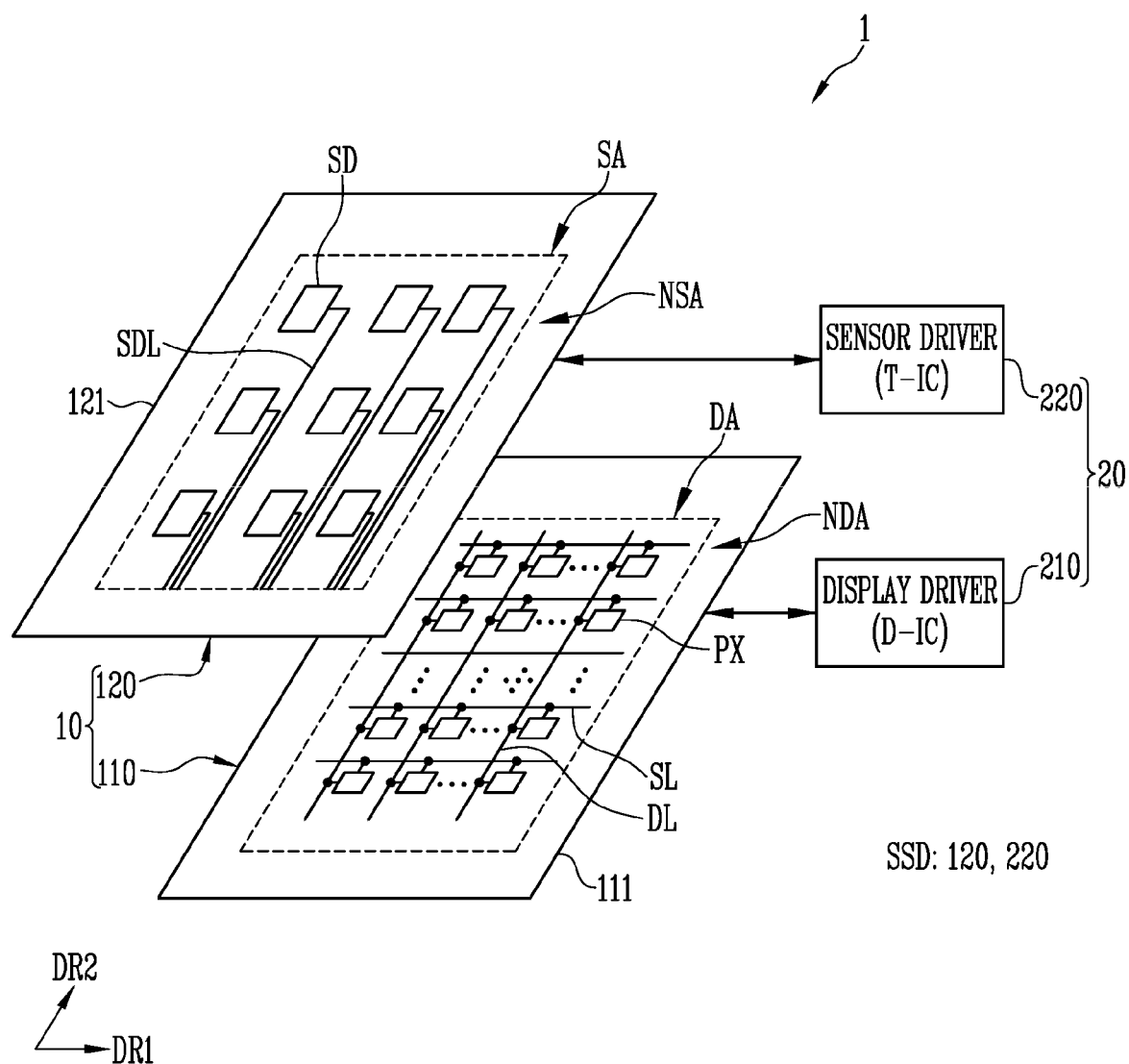
FIG. 1 is a diagram illustrating a display device according to some embodiments of the disclosure.

Hereinafter, aspects of some embodiments of the disclosure will be described in more detail with reference to the accompanying drawings so that those skilled in the art may easily carry out the disclosure. Aspects of some embodiments of the present disclosure may be implemented in various different forms and are not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, aspects of embodiments of the present disclosure are not limited to the embodiments disclosed below, and may be modified in various forms and may be implemented. In addition, each of the embodiments disclosed below may be implemented alone or in combination with at least one of other embodiments.

FIG. 1 is a diagram illustrating a display device according to embodiments of the disclosure.

Referring to FIG. 1, the display device 1 may be applied to an electronic device such as a computer, a laptop computer, a cellular phone, a smart phone, a personal digital assistant (PDA), a portable multimedia player (PMP), a digital TV, a digital camera, a portable game console, a navigation device, a wearable device, an internet of things (IOT) device, an internet of everything (IoE) device, an e-book, a virtual reality (VR) device, an augmented reality (AR) device, a vehicle navigation system, a video phone, a surveillance system, an automatic focus system, a tracking system, or a motion sensing system.

The display device 1 may include a panel 10 and a driving circuit unit 20 for driving the panel.

The panel 10 may include a display unit 110 (or a display panel) for displaying an image and a sensor unit 120 (or a sensor panel) for sensing an external input such as touch, pressure, fingerprint, or hovering. For example, the panel 10 may include pixels PX and sensors SD (sensor cells, or sensor electrodes) positioned to overlap at least a portion of the pixels PX. For example, the pixels PX may display an image in a display frame period unit. For example, the sensors SD may sense an input of a user in a sensing frame period unit. A sensing frame period and a display frame period may be independent of each other and may be different from each other. The sensing frame period and the display frame period may be synchronized with each other or may be asynchronous. The sensor unit 120 may configure a sensor device SSD (or an input sensing device) together with a sensor driver 220.

According to some embodiments, the display unit 110 and the sensor unit 120 may be separately manufactured, and then arranged and/or combined so that at least one area overlaps each other. According to some embodiments, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or other insulating layers or various functional layer (for example, an optical layer or a protective layer).

Meanwhile, in FIG. 1, the sensor unit 120 is located on a front surface (for example, an upper surface on which an image is displayed) of the display unit 110, but a position of the sensor unit 120 is not limited thereto. For example, according to some embodiments, the sensor unit 120 may be located on a back surface or both surfaces of the display unit 110. According to some embodiments, the sensor unit 120 may be located on at least one edge area of the display unit 110.

The display unit 110 may include a display substrate 111 and a plurality of pixels PXL formed on the display substrate 111. The pixels PXL may be located in a display area DA of the display substrate 111.

The display substrate 111 may include the display area DA where an image is displayed and a non-display area NDA outside the display area DA. According to some embodiments, the display area DA may be located in a center area of the display unit 110, and the non-display area NDA may be located in an edge area of the display unit 110 to surround the display area DA.

The display substrate 111 may be a rigid substrate or a flexible substrate, and a material or a physical property thereof is not particularly limited. For example, the display substrate 111 may be a rigid substrate formed of glass or tempered glass, or a flexible substrate formed of a thin film of a plastic or metal material.

Scan lines SL and data lines DL, and pixels PX connected to the scan lines SL and the data lines DL may be located in the display area DA. The pixels PX may be selected by a scan signal of a turn-on level supplied from the scan lines SL, receive a data signal from the data lines DL, and emit light of a luminance corresponding to the data signal. Therefore, an image corresponding to the data signal may be displayed in the display area DA. In the disclosure, a structure, a driving method, and the like of the pixels PX are not particularly limited. For example, each of the pixels PX may be implemented as a pixel employing various currently known structures and driving methods.

In the non-display area NDA, various lines and/or a built-in circuit unit connected to the pixels PXL of the display area DA may be located. For example, a plurality of lines for supplying various power and control signals to the display area DA may be located in the non-display area NDA, and a scan driver or the like may be further located in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each of the pixels PX is not limited to a case where only an organic light emitting element is included. For example, a light emitting element of each of the pixels PX may be configured of an organic light emitting diode, an inorganic light emitting diode, a quantum dot/well light emitting diode, or the like. According to some embodiments, a plurality of light emitting elements may be provided in each of the pixels PX. At this time, the plurality of light emitting elements may be connected in series, parallel, series-parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 may include a sensor substrate 121 and a plurality of sensors SD formed on the sensor substrate 121. The sensors SD may be located in a sensing area SA on the sensor substrate 121.

The sensor unit 120 may include the sensor substrate 121 and the plurality of sensors SD formed on the sensor substrate 121. The sensors SD may be positioned in the sensing area SA of the sensor substrate 121. The sensors SD may be connected to sensor lines SDL. When the touch sensor is configured in a self-capacitance method, the sensors SD and the sensor lines SDL may be connected one-to-one.

The sensor substrate 121 may be a rigid or flexible substrate, and may be configured of at least one layer of insulating layer. In addition, the sensor substrate 121 may be a transparent or translucent light-transmitting substrate, but is not limited thereto. That is, in the disclosure, a material and a physical property of the sensor substrate 121 are not particularly limited. For example, the sensor substrate 121 may be a rigid substrate formed of glass or tempered glass, or a flexible substrate formed of a thin film of a plastic or metal material. In addition, according to some embodiments, at least one substrate (for example, the display substrate 111, an encapsulation substrate and/or a thin film encapsulation layer) configuring the display unit 110, at least one layer of insulating layer, functional layer, or the like located in an inside and/or on an outer surface of the display unit 110 may be used as the sensor substrate 121.

The sensor substrate 121 may include the sensing area SA in which an external input may be sensed, and a peripheral area NSA outside the sensing area SA. According to some embodiments, the sensing area SA may be arranged to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when the external input is provided on the display area DA, the external input may be detected through the sensor unit 120.

The sensing area SA may be set as an area capable of responding to the external input (that is, an active area of a sensor). To this end, the sensors SD for sensing the external input may be located in the sensing area SA. For example, the sensors SD may be arranged in a matrix form based on a first direction DR1 and a second direction DR2 orthogonal to the first direction DR1. According to some embodiments, the first direction DR1 and the second direction DR2 may not be orthogonal to each other. According to some embodiments, the sensors SD may be arranged in a circular or elliptical shape or may be arranged obliquely, and may not necessarily be arranged in a matrix form. Each of the sensors SD may have various shapes such as a quadrangle, a triangle, a circle, and a mesh shape, and a shape of each of the sensors SD is not particularly limited.

According to some embodiments, each of the sensors SD may have conductivity by including at least one of a metal material, a transparent conductive material, or various other conductive materials. For example, the sensors SD may include at least one of various metal materials including gold (Au), silver (Ag), aluminum (Al), molybdenum (Mo), chromium (Cr), titanium (Ti), nickel (Ni), neodymium (Nd), copper (Cu), or platinum (Pt), or an alloy thereof. At this time, the sensors SD may be configured in a mesh shape. In addition, the sensors SD may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube, graphene, or the like. In addition, the sensors SD may have conductivity by including at least one of various conductive materials. In addition, each of the sensors SD may be formed as a single layer or multiple layers, and a cross-sectional structure thereof is not particularly limited.

The sensor lines SDL may be positioned on the same layer as the sensors SD. According to some embodiments, the sensor lines SDL may be separated from the sensors SD by an insulating layer and may be positioned on a layer different from that of the sensors SD. At this time, the sensor lines SDL may be connected to corresponding sensors SD through a contact hole of the insulating layer. The sensor lines SDL may be formed of various conductive materials, and may be formed of the same material as the sensors SD or may be formed of a material different from that of the sensors SD.

The driving circuit unit 20 may include a display driver 210 for driving the display unit 110 and a sensor driver 220 for driving the sensor unit 120. Each of the display driver 210 and the sensor driver 220 may be implemented as an integrated circuit (IC) (for example, a display integrated circuit (D-IC) and a sensor integrated circuit (T-IC)).

The display driver 210 may be electrically connected to the display 110 to drive the pixels PX. For example, the display driver 210 may provide a data signal to the pixels PX. According to some embodiments, the display driver 210 may include a data driver and a timing controller, and the scan driver may be separately mounted in the non-display area NDA of the display 110 (refer to FIG. 2). According to some embodiments, the display driver 210 may include all or at least a portion of the data driver, the timing controller, and the scan driver.

The sensor driver 220 may be electrically connected to the sensor unit 120 to drive the sensor unit 120. For example, the sensor driver 220 may be connected to the sensors SD through the sensor lines SDL. The sensor driver 220 may include a sensor receiver (or a receiver). According to some embodiments, the sensor driver 220 may further include a sensor transmitter (or a transmitter). The sensor transmitter and the sensor receiver may be integrated in one IC, but are not limited thereto.

Figure 2:
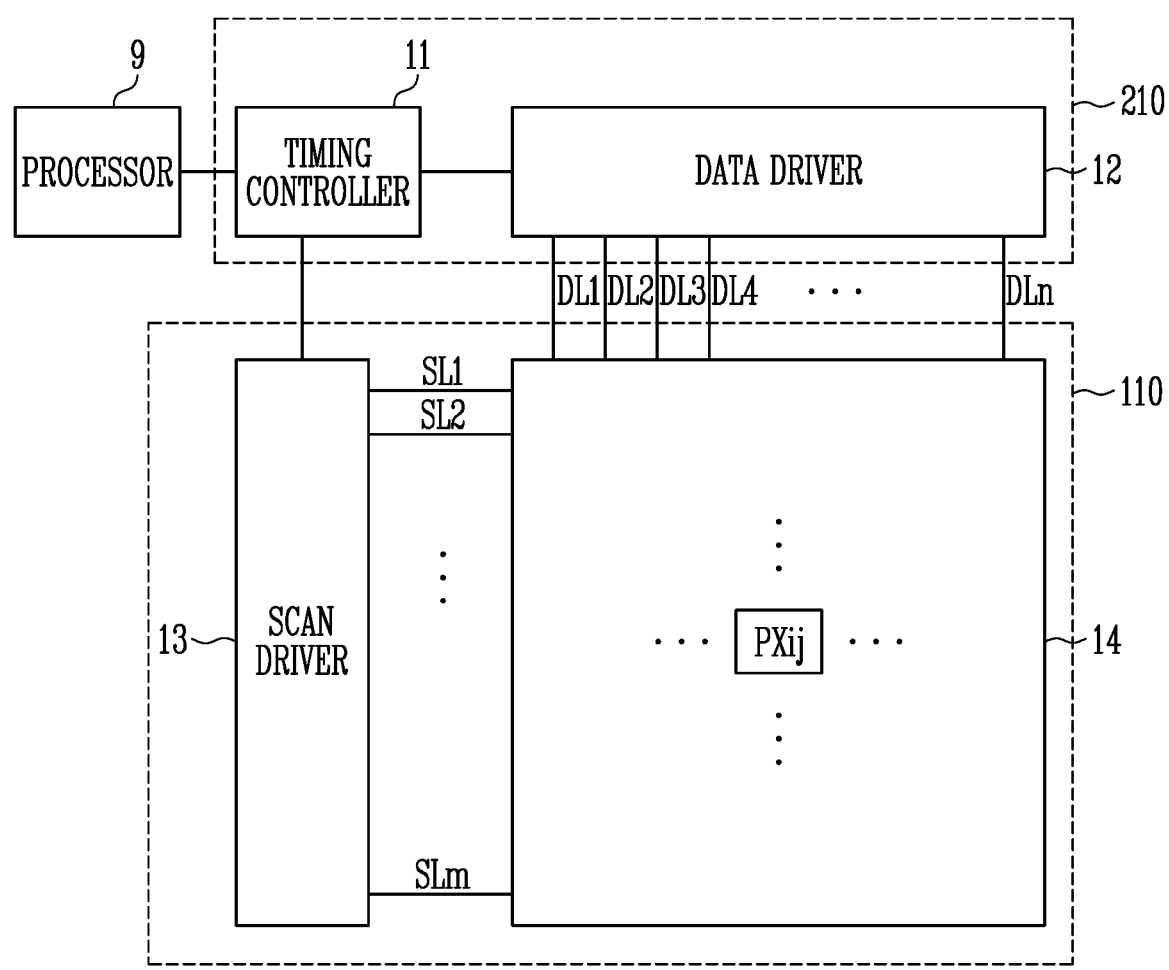
FIG. 2 is a diagram illustrating aspects of a display unit and a display driver included in the display device of FIG. 1 according to some embodiments.

FIG. 2 is a diagram illustrating aspects of the display unit and the display driver included in the display device of FIG. 1 according to some embodiments.

Referring to FIGS. 1 and 2, the display driver 210 may include a data driver 12 and a timing controller 11, and the display unit 110 may include a scan driver 13. However, as described above, whether each functional unit is integrated into one IC, integrated into a plurality of ICs, or mounted on the display substrate 111 may be variously configured according to a specification of the display device 1.

The timing controller 11 may receive grayscales and control signals for each frame from a processor 9. Here, the processor 9 may correspond to a graphics processing unit (GPU), a central processing unit (CPU), an application processor (AP), and the like. The control signals may include a vertical synchronization signal, a horizontal synchronization signal, a data enable signal, and the like.

Each cycle of the vertical synchronization signal may correspond to each frame period. Each cycle of the horizontal synchronization signal may correspond to each horizontal period. The grayscales may be supplied in horizontal line unit in each horizontal period in response to a pulse of an enable level of the data enable signal. A horizontal line may mean pixels (for example, a pixel row) connected to the same scan line and emission line.

The timing controller 11 may render the grayscales to correspond to the specification of the display device 1. For example, the processor may provide a red grayscale, a green grayscale, and a blue grayscale for each unit dot. For example, when a pixel unit 14 has an RGB stripe structure, the pixel may correspond to each grayscale one-to-one. In this case, rendering of the grayscales may not be required. However, for example, when the pixel unit 14 has a PEN-TILE™ structure, because adjacent unit dots share the pixel, the pixel may not correspond to each grayscale one-to-one. In this case, rendering of the grayscales may be required. The rendered or non-rendered grayscales may be provided to the data driver 12. In addition, the timing controller 11 may provide a data control signal to the data driver 12. In addition, the timing controller 11 may provide a scan control signal to the scan driver 13.

The data driver 12 may generate data voltages to be provided to data lines DL1, DL2, DL3, DL4, . . . , and DLn using the grayscales and the data control signal received from the timing controller 11. n may be a positive integer.

The scan driver 13 may generate scan signals to be provided to scan lines SL1, SL2, . . . , and SLm using the scan control signal (for example, a clock signal, a scan start signal, and the like) received from the timing controller 11. m may be a positive integer. The scan driver 13 may sequentially supply scan signals having a turn-on level of pulse to scan lines SL1 to SLm. The scan driver 13 may include scan stages configured in a form of a shift register. The scan driver 13 may generate the scan signals in a method of sequentially transferring a scan start signal having a turn-on level of pulse form to a next scan stage according to control of the clock signal.

The pixel unit 14 includes the pixels. Each of the pixels may be connected to corresponding data line and scan line. For example, the pixel PXij may be connected to an i-th scan line and a j-th data line. The pixels may include pixels emitting light of a first color, pixels emitting light of a second color, and pixels emitting light of a third color. The first color, the second color, and the third color may be different colors. For example, the first color may be one of red, green, and blue, the second color may be one other than the first color among red, green, and blue, and the third color may be the other color other than the first color and the second color among red, green, and blue. In addition, magenta, cyan, and yellow may be used as the first to third colors instead of red, green, and blue.

Figure 3:
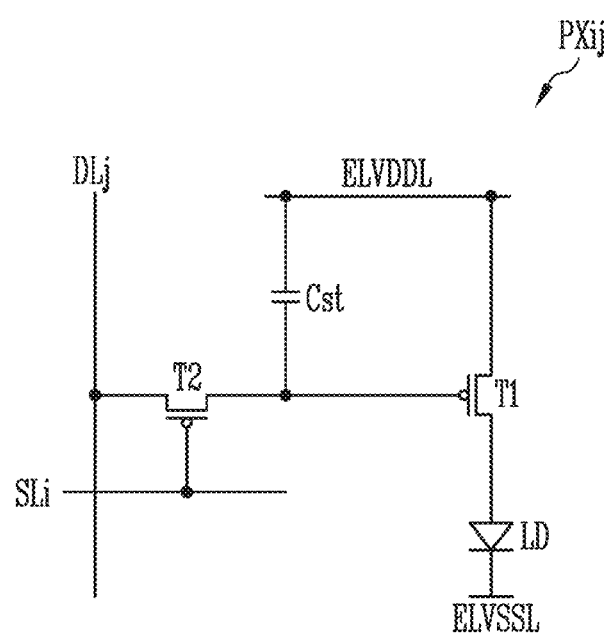
FIG. 3 is a diagram illustrating aspects of a pixel included in the display unit of FIG. 2 according to some embodiments.

FIG. 3 is a diagram illustrating aspects of the pixel included in the display unit of FIG. 2 according to some embodiments.

Referring to FIGS. 2 and 3, an example pixel PXij is shown. Because other pixels may also have substantially the same configuration, an overlapping description is omitted.

A gate electrode of a first transistor T1 may be connected to a second electrode of a storage capacitor Cst, a first electrode may be connected to a first power line ELVDDL, and a second electrode may be connected to an anode of the light emitting element LD. The first transistor T1 may be referred to as a driving transistor.

A gate electrode of the second transistor T2 may be connected to the i-th scan line SLi, a first electrode may be connected to the j-th data line DLj, and a second electrode may be connected to the second electrode of the storage capacitor Cst. The second transistor T2 may be referred to as a scan transistor.

A first electrode of the storage capacitor Cst may be connected to the first power line ELVDDL, and the second electrode of the storage capacitor Cst may be connected to the gate electrode of the first transistor T1. In other words, the storage capacitor Cst may be formed between the first power line ELVDDL and the gate electrode of the first transistor T1.

The anode of the light emitting element LD may be connected to the second electrode of the first transistor T1 and a cathode may be connected to a second power line ELVSSL. The light emitting element LD may be a light emitting diode. As described above, the light emitting element LD may be configured of an organic light emitting element, an inorganic light emitting element, a quantum dot/well light emitting element, or the like. In addition, a plurality of light emitting elements may be provided in the pixel PXij. At this time, the plurality of light emitting elements may be connected in series, parallel, series-parallel, or the like. During an emission period of the light emitting element LD, a first power voltage applied to the first power line ELVDDL may be greater than a second power voltage applied to the second power line ELVSSL.

Here, the first and second transistors T1 and T2 are shown as P-type transistors, but those skilled in the art may use at least one transistor by inverting a polarity of a signal to replace at least one transistor with an N-type transistor.

When a scan signal of a turn-on level is applied to the i-th scan line SLi, the second transistor T2 may be turned on. At this time, a data voltage charged in the j-th data line DLj may be stored in the storage capacitor Cst. The first transistor T1 may flow a driving current in response to a gate-source voltage difference maintained by the storage capacitor Cst. The driving current may flow through a path of the first power line ELVDDL, the first transistor T1, the light emitting element LD, and the second power line ELVSSL. The light emitting element LD may emit light with a luminance corresponding to an amount of the driving current.

Meanwhile, a structure and a driving method of the pixel PXij may be variously changed. For example, the pixel PXij may further include other circuit elements such as a compensation transistor for compensating for a threshold voltage or the like of the first transistor T1, an initialization transistor for initializing the gate electrode of the first transistor T1 and/or the anode electrode of the light emitting element LD, an emission control transistor for controlling a period in which the driving current is supplied to the light emitting element LD, and/or a boosting capacitor for boosting a voltage of the gate electrode of the first transistor T1.

Figure 4:
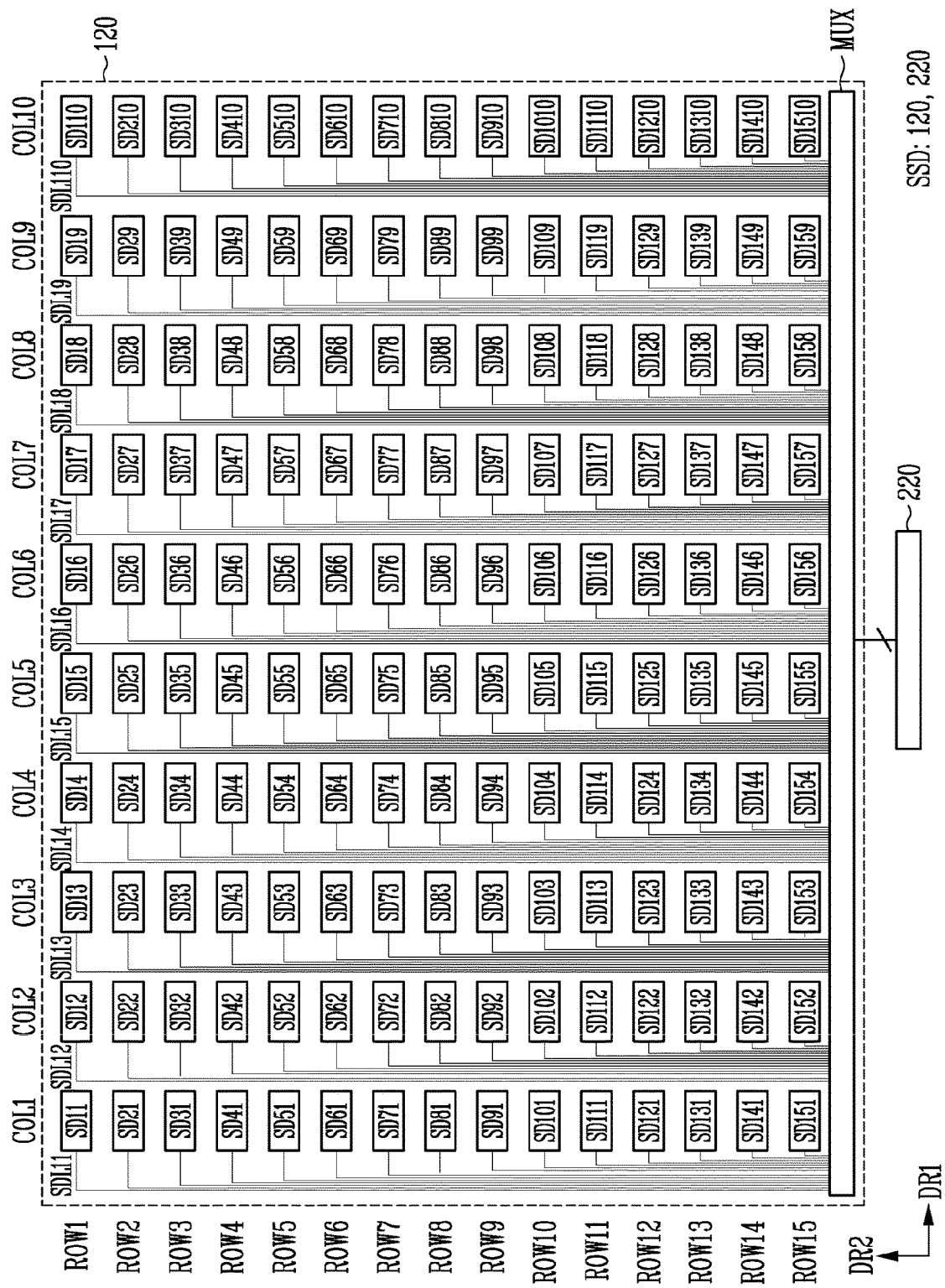
FIG. 4 is a diagram illustrating aspects of a sensor device included in the display device of FIG. 1 according to some embodiments.

FIG. 4 is a diagram illustrating aspects of the sensor device included in the display device of FIG. 1 according to some embodiments.

Referring to FIGS. 1 and 4, the sensor device SSD may include the sensor unit 120 and the sensor driver 220. The sensor device SSD may be included in the display device 1.

The sensor unit 120 may include sensors SD11 to SD1510. "SDij" may mean a sensor positioned in an i-th row and a j-th column. The sensors SD11 to SD1510 may be sequentially arranged in the first direction DR1 and the second direction DR2. For example, the sensors SD11 to SD1510 may be arranged in a matrix form. Hereinafter, for convenience of description, it will be described that the sensor unit 120 includes sensors SD11 to SD1510 arranged along 15 rows ROW1 to ROW15 and 10 columns COL1 to COL10. However, this is an example, and a size of a matrix is not limited thereto, and the size of the matrix (the number of sensors according to this) may be variously changed according to a specification of the sensor device SSD.

The respective sensors SD11 to SD1510 may be connected to different sensor lines SDL11 to SDL110, . . . "SDLij" may mean a sensor line connected to the sensor (that is, SDij) positioned in the i-th row and the j-th column. The respective sensor lines SDL11 to SDL110, . . . may extend in the second direction DR2 and may be connected to corresponding sensors SD11 to SD1510.

A multiplexer MUX may be electrically connected to the sensor lines SDL11 to SDL110, . . . . In addition, the multiplexer MUX may be electrically connected to the sensor driver 220. The multiplexer MUX may select at least one of the sensor lines SDL11 to SDL110, . . . and electrically connect the at least one to the sensor driver 220. For example, when the sensor device SSD performs a sensing operation (or a scan operation for sensing) in a row unit, the multiplexer MUX may select sensor lines connected to at least one (or a specific row) among the sensors SD11 to SS1510 and connect the selected sensor lines to the sensor driver 220. The multiplexer MUX may be provided in the sensor unit 120, but is not limited thereto. An arrangement position of the multiplexer MUX may be variously changed within a range electrically connected between the sensor lines SDL11 to SDL110, . . . and the sensor driver 220.

The sensor driver 220 may apply a reference voltage to the sensors SD11 to SS1510 to charge and discharge a charge to and from the sensors SD11 to SS1510, and sense a capacitance change of the sensors SD11 to SS1510 to determine presence or absence (or a position of the external input) of the external input. The sensor driver 220 may determine presence or absence of the external input to the sensor unit 120 in a self-capacitance method.

Figure 5:
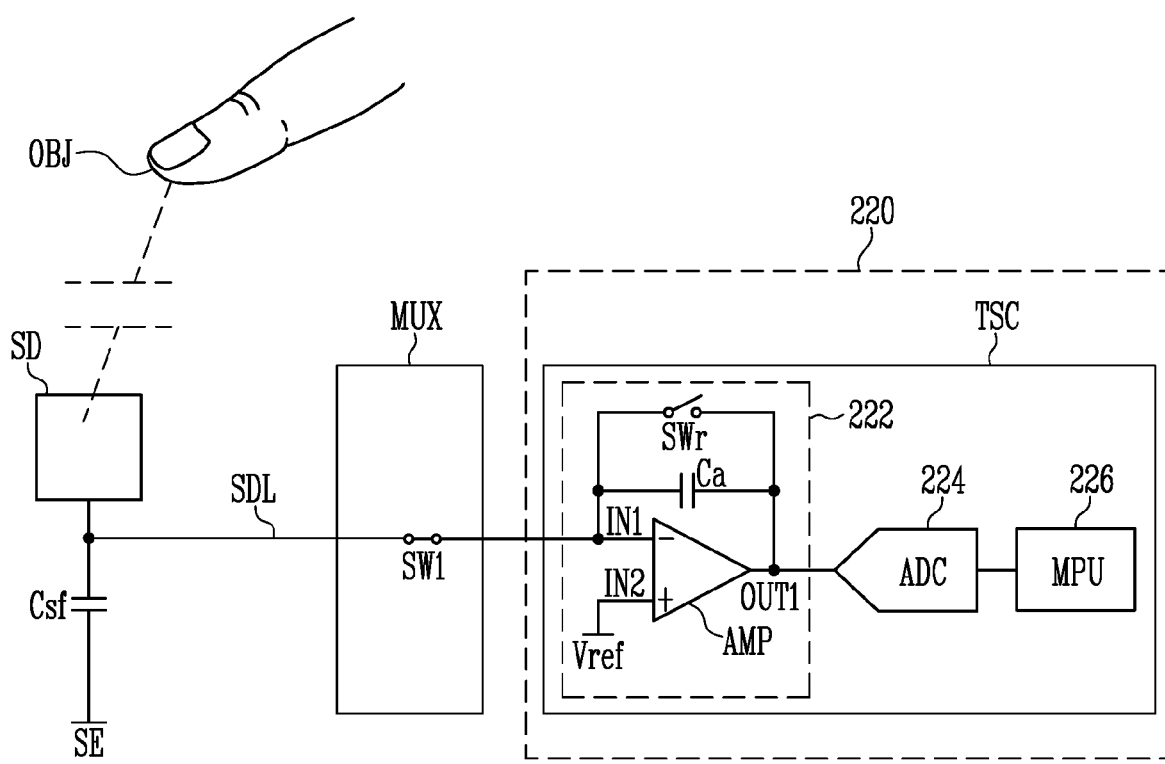
FIG. 5 is a diagram illustrating aspects of a sensor driver included in the sensor device of FIG. 4 according to some embodiments.
Figure 6:
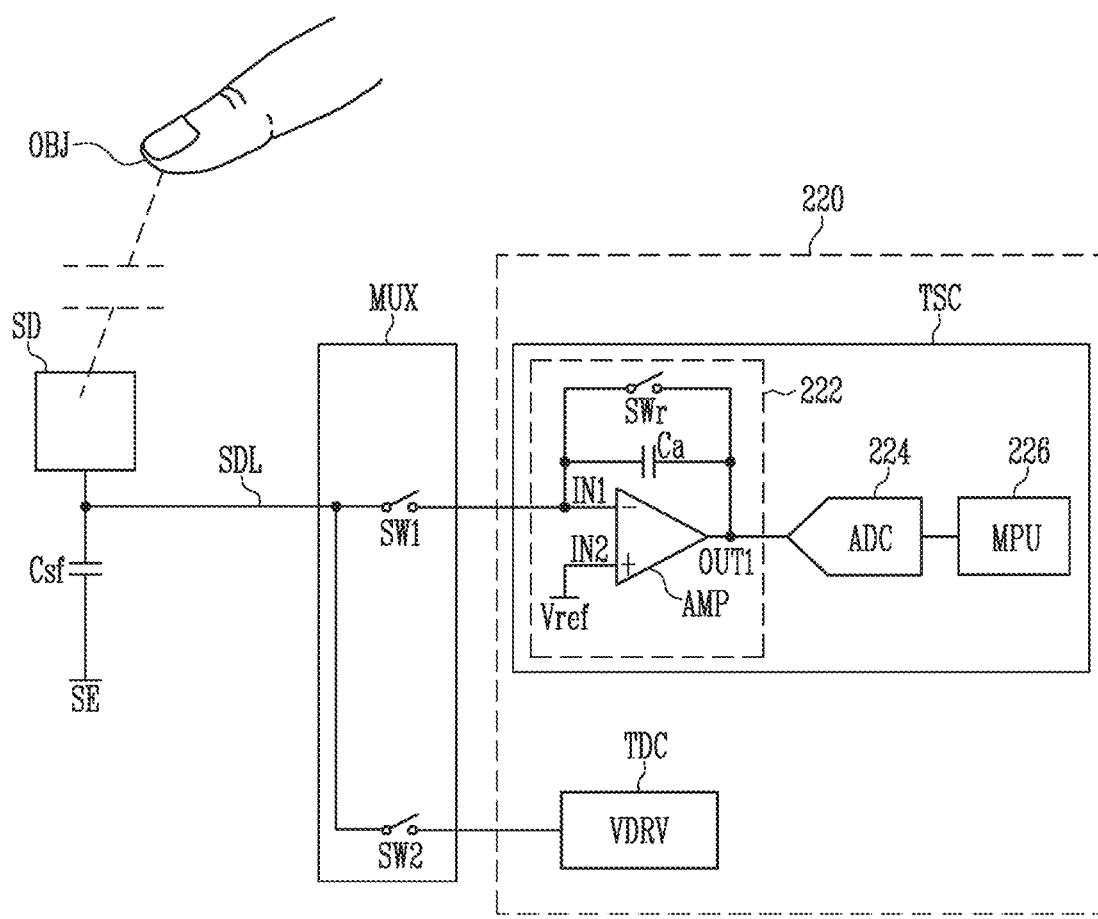
FIG. 6 is a diagram illustrating aspects of the sensor driver included in the sensor device of FIG. 4 according to some embodiments.

FIG. 5 is a diagram illustrating aspects of the sensor driver included in the sensor device of FIG. 4 according to some embodiments. FIG. 6 is a diagram illustrating aspects of the sensor driver included in the sensor device of FIG. 4 according to some embodiments. For convenience of description, the sensor SD, the sensor line SDL, and the multiplexer MUX are further shown in FIGS. 5 and 6.

First, referring to FIGS. 1, 4, and 5, the sensor driver 220 may include a sensor receiver TSC. The sensor receiver TSC may be provided in a column unit of FIG. 4. For example, a plurality of sensor receivers TSC respectively corresponding to the columns COL1 to COL10 of FIG. 4 may be provided in the sensor driver 220. However, the disclosure is not limited thereto. Hereinafter, the description is given based on one sensor SD and sensor line SDL. The same description may be applied to other sensors and sensor lines of the sensor unit 120.

The sensor SD and a support electrode SE may form a self-capacitance Csf. The support electrode SE may be one electrode of the display unit 110. For example, when the display unit 110 is a self-emission type display panel, a cathode of light emitting diodes of pixels may correspond to the support electrode SE. Meanwhile, when the display unit 110 is a non-emission type display panel, a common electrode of the pixels may correspond to the support electrode SE. However, the self-capacitance Csf may not be necessarily one electrode, but may include other electrodes adjacent to the sensor SD and capable of forming a significant capacitance in a sensing process.

The multiplexer MUX may include a first switch SW1. The first switch SW1 may be connected between the sensor line SDL and the sensor driver 220.

The sensor receiver TSC may include a sensor channel 222. The sensor channel 222 may be configured to receive a sensing signal Vsense from the sensor line SDL during a first period in which the first switch SW1 is turned on. The sensor channel 222 may output a voltage signal of a voltage level corresponding to a charge amount charged in the sensor SD to an output terminal OUT1. For example, the sensor channel 222 may be an integrator.

For example, the sensor channel 222 may include an amplifier AMP, a sensing capacitor Ca, and a reset switch SWr. The amplifier AMP may include a first input terminal IN1 connected to the sensor line SDL through the first switch SW1, a second input terminal IN2 receiving a reference voltage Vref, and the output terminal OUT1. For example, the amplifier AMP may be an operational amplifier. For example, the first input terminal IN1 may be an inverting terminal, and the second input terminal IN2 may be a non-inverting terminal.

The sensing capacitor Ca may connect the first input terminal IN1 and the output terminal OUT1. The reset switch SWr may connect the first input terminal IN1 and the output terminal OUT1. According to some embodiments, a resistor connected to the sensing capacitor Ca in parallel may be further provided in the sensor channel 222.

The reference voltage Vref may have a square wave. When the reference voltage Vref is applied to the second input terminal IN2 of the amplifier AMP, the sensing signal Vsense corresponding to the reference voltage Vref may be generated in the sensor SD (and the sensor line SDL). The sensing signal Vsense may have a waveform in which the reference voltage Vref is RC-delayed by a self-capacitance Csf or the like. According to whether an object OBJ is close (for example, touch or no touch), the self-capacitance Csf of the sensor SD may vary, a difference occurs in the charge amount charged in the sensor SD, a waveform of the sensing signal Vsense may vary. For example, the object OBJ may be a user's finger or the like.

In addition, the sensor receiver TSC may further include an analog-to-digital converter (ADC) 224 and a processor 226 (or a micro processor unit (MPU)). The ADC 224 may receive an output signal of the sensor channel 222. The ADC 224 may convert an analog voltage level output from the sensor channel 222 into a digital value and output the digital value. The processor 226 may receive the output signal of the ADC 224. The processor 226 may determine the presence or absence of the external input using the received digital value.

Referring to FIGS. 5 and 6, the sensor driver 220 may further include a sensor transmitter TDC.

For connection between the sensor line SDL and the sensor transmitter TDC, the multiplexer MUX may further include a second switch SW2. The second switch SW2 and the first switch SW1 may be connected to the same sensor line SDL.

The sensor transmitter TDC may be configured to supply a shield signal VDRV (a boost signal, or the reference signal) to the sensor line SDL during a second period in which the second switch SW2 is turned on. The second period is different from the first period in which the first switch SW1 is turned on, and the second period and the first period may not overlap each other. The shield signal VDRV is described later with reference to FIG. 10.

Figure 8A:
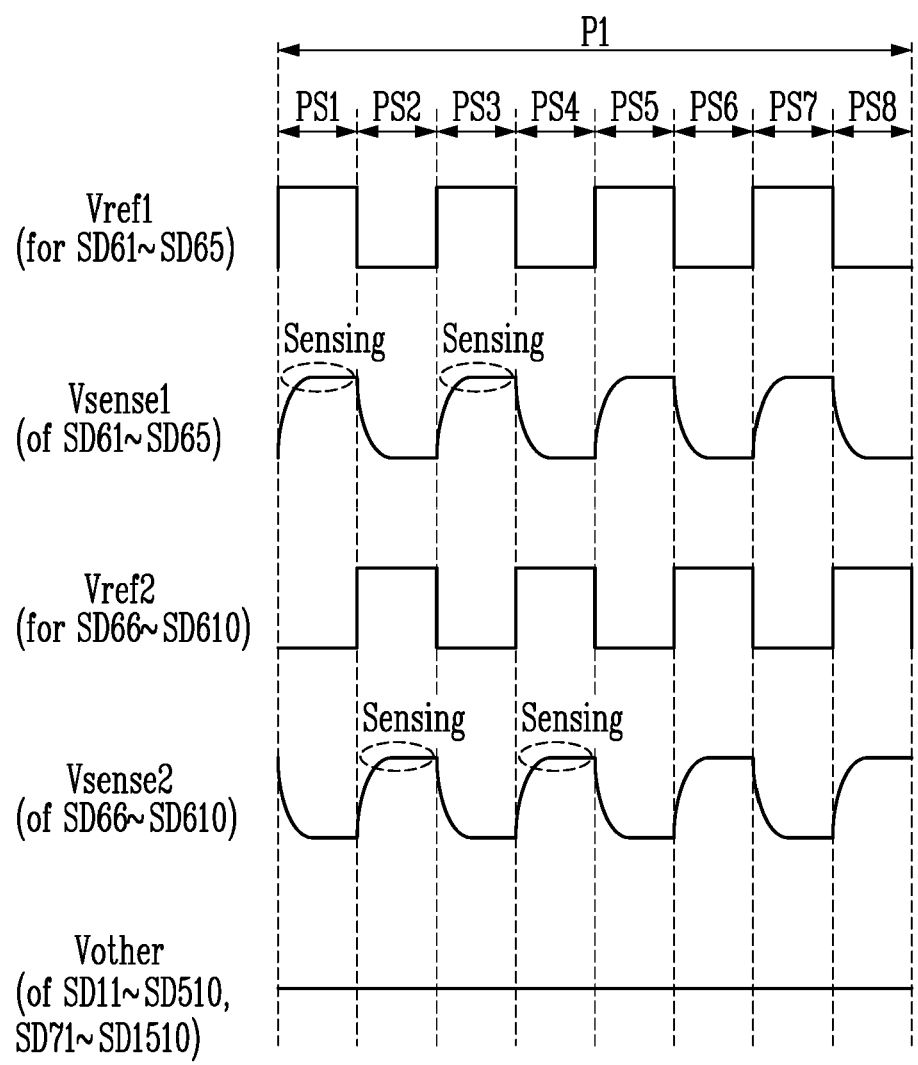

FIG. 7 is a diagram illustrating aspects of an operation of the sensor device of FIG. 4 according to some embodiments. For convenience of description, only the sensor unit 120 is shown in FIG. 7, and the sensor unit 120 is briefly shown based on the sensors SD11 to SD1510. FIGS. 8A and 8B are diagrams illustrating aspects of signals measured by the sensor device of FIG. 7 according to some embodiments. FIGS. 8A and 8B illustrate embodiments in which sensing timings (or sampling timings for sensing signals Vsense1 and Vsense2) are different from each other.

Referring to FIGS. 4 to 7, 8A, and 8B, the sensor unit 120 may be divided into a plurality of areas. For example, the sensor unit 120 may be divided into a first area A1 and a second area A2, sensors corresponding to first to fifth columns COL1 to COL5 may be positioned in the first area A1, and sensors corresponding to sixth to tenth columns COL6 to COL10 may be positioned in the second area A2. That is, the first area A1 and the second area A2 may be divided based on a specific column. However, this is an example, and the first area A1 and the second area A2 are not limited thereto.

In embodiments, the sensor device SSD (or the sensor driver 220) may perform the sensing operation on the first area A1 using a first reference signal Vref1 and perform the sensing operation on the second area A2 using a second reference signal Vref2. Here, each of the first and second reference signals Vref1 and Vref2 may be the reference signal Vref of FIG. 5 or may be included in the reference signal Vref. As shown in FIG. 8A, the first and second reference signals Vref1 and Vref2 may have the same waveform, and may have different phases. For example, the first and second reference signals Vref1 and Vref2 may be square waves, have the same slew rate, the same magnitude (or voltage level), and the same frequency, and a phase of the second reference signal Vref2 may be substantially opposite to a phase of the first reference signal Vref1 (reverse phase or 180 degree phase shift). For example, the second reference signal Vref2 may be a signal in which the phase of the first reference signal Vref1 is reversed (a reversed reference signal, or an offset signal).

When the sensing operation is performed using only the first reference signal Vref1 or the second reference signal Vref2, EMI (or noise) may occur by toggling the first reference signal Vref1 or the second reference signal Vref2. On the other hand, when the sensing operation is performed simultaneously using the first and second reference signals Vref1 and Vref2 having mutually reverse phases, EMI caused by the first and second reference signals Vref1 and Vref2 may be offset each other, and the EMI may be reduced. In addition, the sensor device SSD uses the first and second reference signals Vref1 and Vref2 as the reference signal for the sensing operation, and does not require a separate offset signal except for the reference signal. Therefore, additional power consumption for generating an offset signal may not occur. That is, EMI may be minimized or reduced without an increase of power consumption. This is described again with reference to FIG. 13.

The sensor device SSD may perform the sensing operation in one row unit. For example, the sensor device SSD may simultaneously perform a sensing operation on 61st to 610th sensors SD61 to SD610 included in a sixth row ROW6 in a first period P1.

According to some embodiments, the sensor device SSD may perform the sensing operation on the 61 st to 65th sensors SD61 to SD65 (a first sensor group SD_G1, or first target sensors) included in the first area A1 using the first reference signal Vref1, and simultaneously, may perform the sensing on the 66th to 610th sensors SD66 to SD610 (a second sensor group SD_G2, or second target sensors) included in the second area A2 using the second reference signal Vref2. For example, as described with reference to FIG. 5, the sensor device SSD may apply the first reference signal Vref1 to each of the 61 st to 65th sensors SD61 to SD65 of the first area A1 to receive a first sensing signal Vsense1 from each of the 61st to 65th sensors SD61 to SD65. Similarly, the sensor device SSD may apply the second reference signal Vref2 to each of the 66th to 610th sensors SD66 to SD610 of the second area A2 to receive a second sensing signal Vsense2 from each of the 66th to 610th sensors SD66 to SD610.

As shown in FIG. 8A, the first sensing signal Vsense1 may have a waveform corresponding to the first reference signal Vref1, and the second sensing signal Vsense2 may have a waveform corresponding to the second reference signal Vref2. As the first and second reference signals Vref1 and Vref2 have mutually reverse phases, a phase of the first sensing signal Vsense1 and a phase of the second sensing signal Vsense2 may also be substantially opposite to each other.

Meanwhile, during the first period P1, the second reference signal Vref2 (a signal in which the phase of the first reference signal Vref1 is reversed, or the offset signal) may not be applied to the sensors of the first area A1, and the first reference signal Vref1 may not be applied to the sensors of the second area A2. For example, except for the first and second sensor groups SD_G1 and SD_G2 which are sensing targets (for example, the 61st to 610th sensors SD61 to SD610 of the sixth row ROW), a separate signal may not be applied to the remaining sensors SD11 to SD510 and SD71 to SD1510. Accordingly, during the first period P1, a voltage Vother at the remaining sensors SD11 to SD510 and SD71 to SD1510 may appear substantially constant. However, the disclosure is not limited thereto.

In embodiments, the sensor device SDD may perform the sensing operation (or a sampling operation) at a time of rising and/or falling of the first and second sensing signals Vsense1 and Vsense2.

For example, as shown in FIG. 8A, with respect to the first sensing signal Vsense1, the sensor device SSD may perform the sensing operation in a first sub-period PS1 and the third sub-period PS3 (a fifth sub-period PS5, and a seventh sub-period PS7) in which a level of the first sensing signal Vsense1 increases. First to eighth sub-periods PS1 to PS8 may be included in the first period P1. For example, in the first and third sub-periods PS1 and PS3, the reset switch SWr in the sensor channel 222 (refer to FIG. 5) corresponding to each of the 61st to 65th sensors SD61 to SD65 may be maintained in a turn-off state, and a sampling operation on the first sensing signal Vsense1 may be performed. With respect to the second sensing signal Vsense2, the sensor device SSD may perform the sensing operation in the second sub-period PS2 and the fourth sub-period PS4 (the sixth sub-period PS6, and the eighth sub-period PS8) in which a level of the second sensing signal Vsense2 increases. For example, in the second and fourth sub-periods PS2 and PS4, the reset switch SWr in the sensor channel 222 (refer to FIG. 5) corresponding to each of the 66th to 610th sensors SD66 to SD610 may be maintained in a turn-off state, and a sampling operation on the second sensing signal Vsense2 may be performed. In this case, a sensing timing (or a sampling timing) for the first sensing signal Vsense1 (or the 61st to 65th sensors SD61 to SD65) may be different from a sensing timing for the second sensing signal Vsense2 (or the 66th to 610th sensors SD66 to SD610).

As another example, as shown in FIG. 8B, with respect to the first sensing signal Vsense1, the sensor device SDD may also perform the sensing operation in the second sub-period PS2 and the fourth sub-period PS4 (the sixth sub-period PS6, and the eighth sub-period PS8) in which the level of the first sensing signal Vsense1 decreases. With respect to the second sensing signal Vsense2, the sensor device SDD may perform the sensing operation in the third sub-period PS3 and the fifth sub-period PS5 (the first sub-period PS1, and the seventh sub-period PS7) in which the level of the second sensing signal Vsense2 decreases.

As still another example, by combining FIGS. 8A and 8B, in each of the first to eighth sub-periods PS1 to PS8, the sensor device SDD may also perform the sensing operation (or the sampling operation) on the first and second sensing signals Vsense1 and Vsense2. In this case, the sensing timing (or the sampling timing) for the first sensing signal Vsense1 (or the 61st to 65th sensors SD61 to SD65) may be the same as the sensing timing for the second sensing signal Vsense2 (or the 66th to 610th sensors SD66 to SD610).

As described above, because the sensor device SSD performs the sensing operation by simultaneously using the first and second reference signals Vref1 and Vref2 having mutually reverse phases, the EMI caused by the first and second reference signals Vref1 and Vref2 may be offset each other, and the EMI may be reduced.

Figure 9:
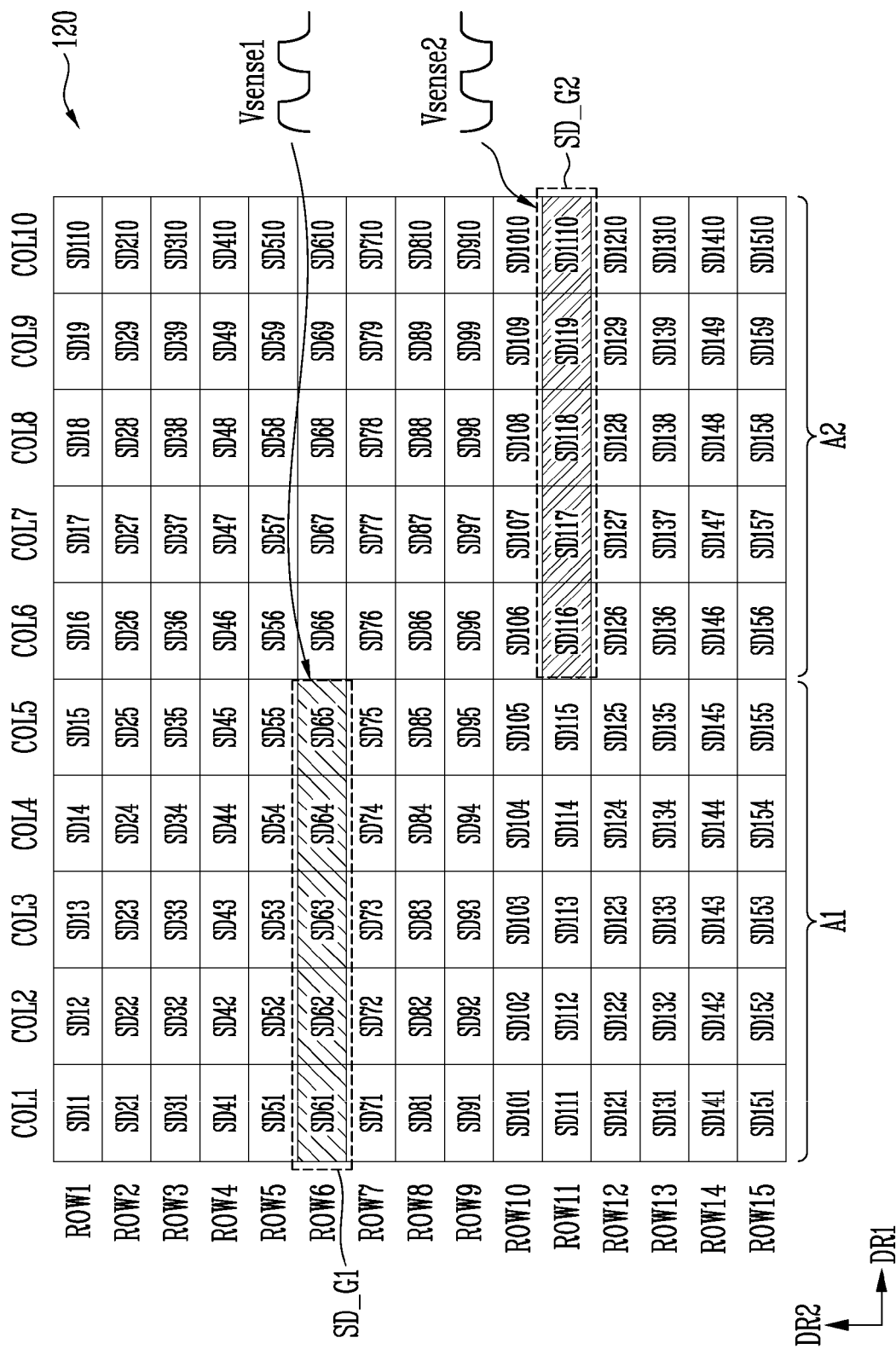
FIG. 9 is a diagram illustrating aspects of the operation of the sensor device of FIG. 4 according to some embodiments.

FIG. 9 is a diagram illustrating aspects of the operation of the sensor device of FIG. 4 according to some embodiments.

Referring to FIGS. 4 to 7 and 9, the embodiments of FIG. 9 may be substantially the same as or similar to the embodiments of FIG. 7, except for a position of the sensor groups SD_G1 and SD_G2 which are sensing targets. Therefore, some overlapping description may not be repeated.

According to some embodiments, the sensor device SSD may perform the sensing operation in one row unit for each area. The first sensor group SD_G1 of the first area A1 and the second sensor group SD_G2 of the second area A2, which are the sensing targets on which the sensing operation is to be simultaneously performed, may be included in different rows.

For example, the sensor device SSD may perform the sensing operation using the first reference signal Vref1 on the 61st to 65th sensors SD61 to SD65 (or the first sensor group SD_G1) of the sixth row ROW6 of the first area A1, and simultaneously, may perform the sensing operation using the second reference signal Vref2 on 116th to 1110th sensors SD116 to SD1110 (or the second sensor group SD_G2) of an eleventh row ROW11 of the second area A2.

When the first and second reference signals Vref1 and Vref2 having mutually reverse phases are applied to adjacent sensors (for example, the 65th sensor SD65 and the 66th sensor SD66 of FIG. 7), sensitivity (or a signal-to-noise ratio (SNR)) of the sensing signals Vsense1 and Vsense2 may be deteriorated. Therefore, the sensor device SSD may improve the sensitivity of the sensing signals Vsense1 and Vsense2 by causing the first sensor group SD_G1 using the first reference signal Vref1 and the second sensor group SD_G2 using the second reference signal Vref2 to be spaced apart from each other.

In FIG. 9, the first sensor group SD_G1 and the second sensor group SD_G2 are spaced apart from each other by five rows, but the disclosure is not limited thereto. For example, the first sensor group SD_G1 and the second sensor group SD_G2 may be spaced apart from each other by one, two, three, four, six or more rows (that is, at least one row).

Figure 10:
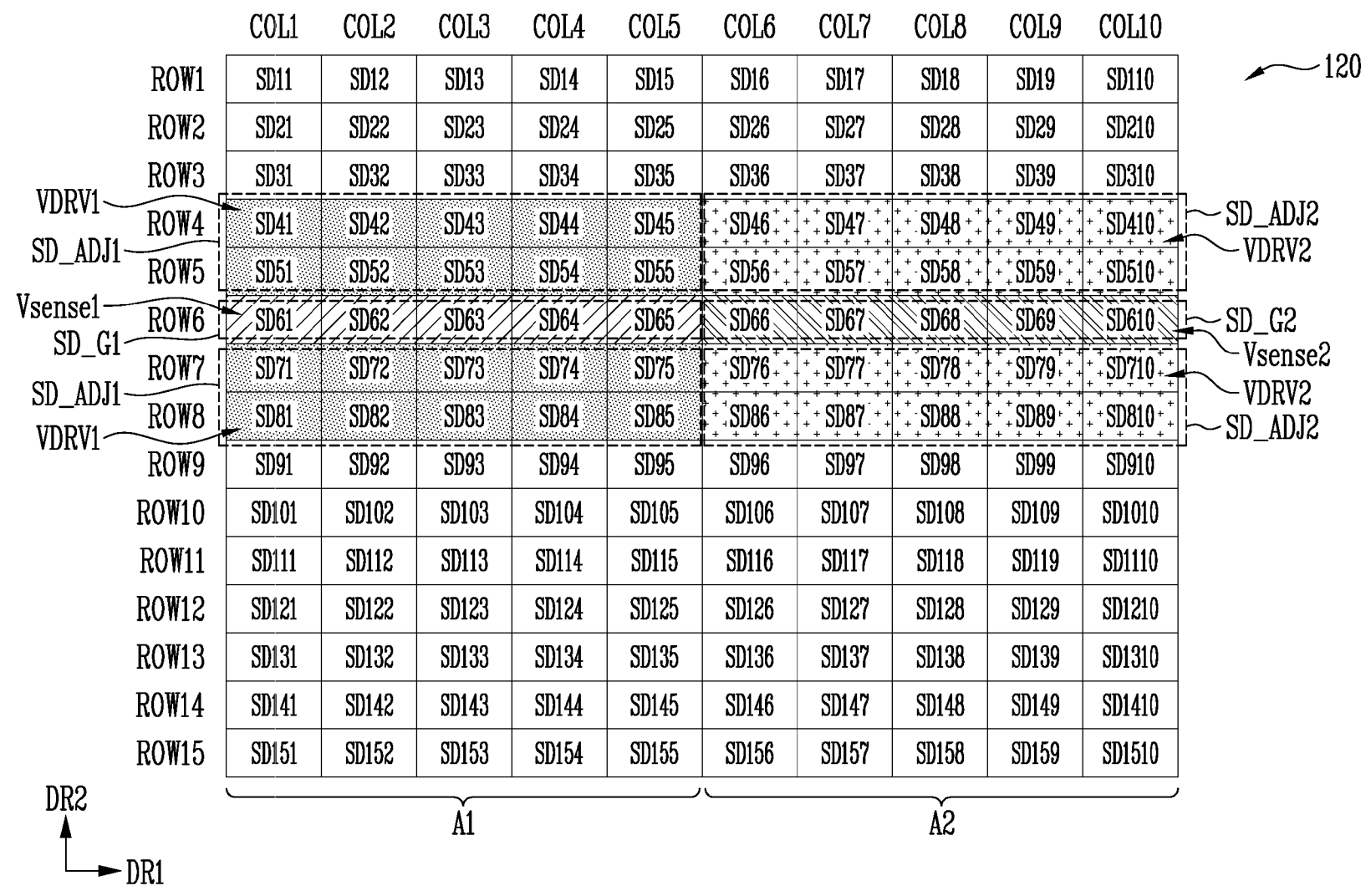
Figure 11:
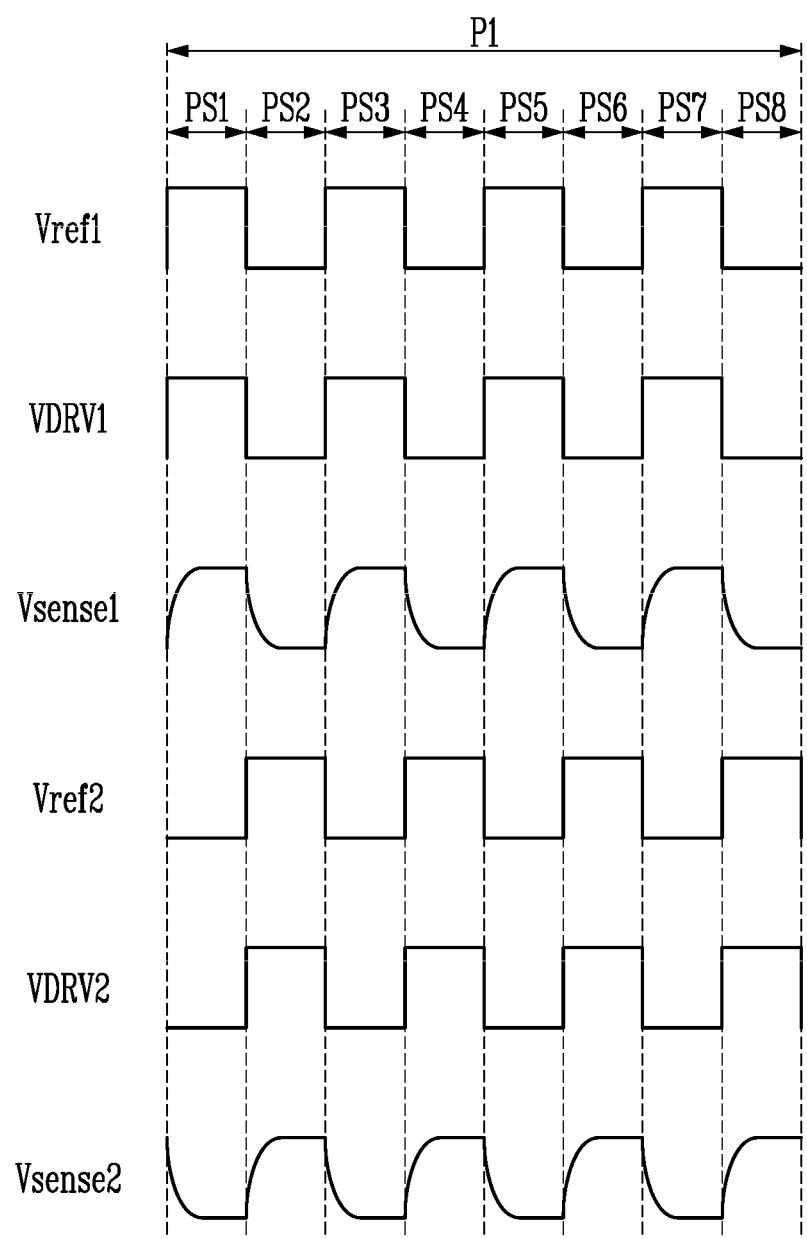
FIG. 11 is a diagram illustrating aspects of signals measured by the sensor device of FIG. 10 according to some embodiments.

FIG. 10 is a diagram illustrating aspects of the operation of the sensor device of FIG. 4 according to some embodiments. FIG. 11 is a diagram illustrating aspects of signals measured by the sensor device of FIG. 10 according to some embodiments.

Referring to FIGS. 4 to 11, except for shield signals VDRV1 and VDRV2, the embodiments of FIG. 10 may be substantially the same as or similar to the embodiments of FIG. 7. Therefore, some overlapping description may not be repeated.

A first shield signal VDRV1 (or a third reference signal) may be applied to first adjacent sensors SD_ADJ1 adjacent to the first sensor group SD_G1 which is the sensing target of the first area A1. Here, the first adjacent sensors SD_ADJ1 may be sensors included in the same column as the first sensor group SD_G1 (or sensors) and adjacent to the first sensor group SD_G1 within at least one row. The first shield signal VDRV1 may be the shield signal VDRV of FIG. 6 or may be included in the shield signal VDRV.

For example, when the first sensor group SD_G1 includes the 61st to 65th sensors SD61 to SD65 of the sixth row ROW6, the first adjacent sensors SD_ADJ1 may include 51st to 55th sensors SD51 to SD55 of a fifth row ROW5 and 71st to 75th sensors SD71 to SD75 of a seventh row ROW7 adjacent to the first sensor group SD_G1 within one row. In addition, the first adjacent sensors SD_ADJ1 may further include 41st to 45th sensors SD41 to SD45 of a fourth row ROW4 and 81st to 85th sensors SD81 to SD85 of an eighth row ROW8 adjacent to the first sensor group SD_G1 within two rows.

As shown in FIG. 11, the first shield signal VDRV1 may have substantially the same waveform and the same phase as the first reference signal Vref1. For example, the first shield signal VDRV1 and the first reference signal Vref1 may have a square wave and have the same frequency and the same phase.

When the first shield signal VDRV1 is applied to the first adjacent sensors SD_ADJ1 during the first period P1 in which sensing is performed on the first sensor group SD_G1 using the first reference signal Vref1, a capacitance between the first sensor group SD_G1 and the first adjacent sensors SD_ADJ1 may be substantially excluded by the first shield signal VDRV1 and the first sensing signal Vsense1 (or the first reference signal Vref1) having mutually similar phases, the first sensing signal Vsense1 of the first sensor group SD_G1 may be boosted by the first shield signal VDRV1, and thus the SNR of the first sensing signal Vsense1 may be improved. Therefore, detection capability for the external input of the sensor device SSD may be improved.

Similar to an operation in the first area A1, a second shield signal VDRV2 (or a fourth reference signal) may be applied to second adjacent sensors SD_ADJ2 adjacent to the second sensor group SD_G2 which is the sensing target. Here, the second adjacent sensors SD_ADJ2 may be sensors included in the same column as the second sensor group SD_G2 (or sensors) and adjacent to the second sensor group SD_G2 within at least one row. The second shield signal VDRV2 may be the shield signal VDRV of FIG. 6 or may be included in the shield signal VDRV.

For example, when the second sensor group SD_G2 includes the 66th to 610th sensors SD66 to SD610 of the sixth row ROW6, the second adjacent sensors SD_ADJ2 may include 56th to 510th sensors SD56 to SD510 of the fifth row ROW5 and 76th to 710th sensors SD76 to SD710 of the seventh row ROW7. In addition, the second adjacent sensors SD_ADJ2 may further include 46th to 410th sensors SD46 to SD410 of the fourth row ROW4 and 86th to 810th sensors SD86 to SD810 of the eighth row ROW8.

As shown in FIG. 11, the second shield signal VDRV2 may have substantially the same waveform and the same phase as the second reference signal Vref2. For example, the second shield signal VDRV2 and the second reference signal Vref2 may be a square wave and have the same frequency and the same phase. In addition, a phase of the second shield signal VDRV2 may be substantially opposite to a phase of the first shield signal VDRV1, in correspondence with a relationship between the first reference signal Vref1 and the second reference signal Vref2. For example, the second shield signal VDRV2 may be a signal in which the phase of the first shield signal VDRV1 is reversed (a reversed shield signal, or an offset signal).

When the second shield signal VDRV2 is applied to the second adjacent sensors SD_ADJ2 during the first period P1, a capacitance between the second sensor group SD_G2 and the second adjacent sensors SD_ADJ2 may be substantially excluded by the first shield signal VDRV1 and the second sensing signal Vsense2 (or the second reference signal Vref2) having mutually similar phases, the second sensing signal Vsense2 of the second sensor group SD_G2 may be boosted by the second shield signal VDRV2, and thus the SNR of the second sensing signal Vsense2 may be improved.

In addition, by simultaneously using the first and second shield signals VDRV1 and VDRV2 having mutually reverse phases, EMI caused by the first and second shield signals VDRV1 and VDRV2 may be offset each other, and the EMI may be reduced.

FIG. 12 is a diagram illustrating according to some embodiments of the operation of the sensor device of FIG. 4.

Referring to FIGS. 4, 9, 10, and 12, except for positions of the second sensor group SD_G2 and the second adjacent sensors SD_ADJ2 adjacent thereto, the embodiments of FIG. 12 may be substantially the same as or similar to the embodiments of 10. Therefore, some overlapping description may not be repeated.

The first sensor group SD_G1 of the first area A1 and the second sensor group SD_G2 of the second area A2, which are the sensing targets on which the sensing operation is to be simultaneously performed, may be included in different rows. For example, the first sensor group SD_G1 may include the 61th to 65th sensors SD61 to SD65 of the sixth row ROW6, and the second sensor group SD_G2 may include the 116th to 1110th sensors SD116 to SD1110 of the eleventh row RWO11.

In this case, the second adjacent sensors SD_ADJ2 may include 106th to 1010th sensors SD106 to SD1010 of a tenth row ROW10 and 126th to 1210th sensors SD126 to SD1210 of a twelfth row ROW12. In addition, the second adjacent sensors SD_ADJ2 may include 96th to 910th sensors SD96 to SD910 of a ninth row ROW9 and 136th to 1310th sensors SD136 to SD1310 of a thirteenth row ROW13.

When the first and second shield signals VDRV1 and VDRV2 having mutually reverse phases are applied to adjacent sensors (for example, the 55th sensor SD55 and the 56th sensor SD56 of FIG. 10), sensitivity (or an SNR) of the sensing signals Vsense1 and Vsense2 may be deteriorated. Therefore, the sensor device SSD may improve the sensitivity of the sensing signals Vsense1 and Vsense2 by causing the first adjacent sensors SD_ADJ1 to which the first shield signal VDRV1 is applied and the second adjacent sensors SD_ADJ2 to which the second shield signal VDRV2 is applied to be spaced apart from each other.

According to some embodiments, the first sensor group SD_G1, the second sensor group SD_G2, the first adjacent sensors SD_ADJ1, and the second adjacent sensors SD_ADJ2 may be positioned in different rows.

In FIG. 12, the first adjacent sensors SD_ADJ1 and the second adjacent sensors SD_ADJ2 are spaced apart from each other by one row, but the disclosure is not limited thereto. For example, the first adjacent sensors SD_ADJ1 and the second adjacent sensors SD_ADJ2 may be spaced apart from each other by two or more rows. As another example, the first adjacent sensors SD_ADJ1 and the second adjacent sensors SD_ADJ2 may be positioned in substantially different rows, and a portion of the first adjacent sensors SD_ADJ1 and a portion of the second adjacent sensors SD_ADJ2 may be positioned in the same row.

Figure 13:
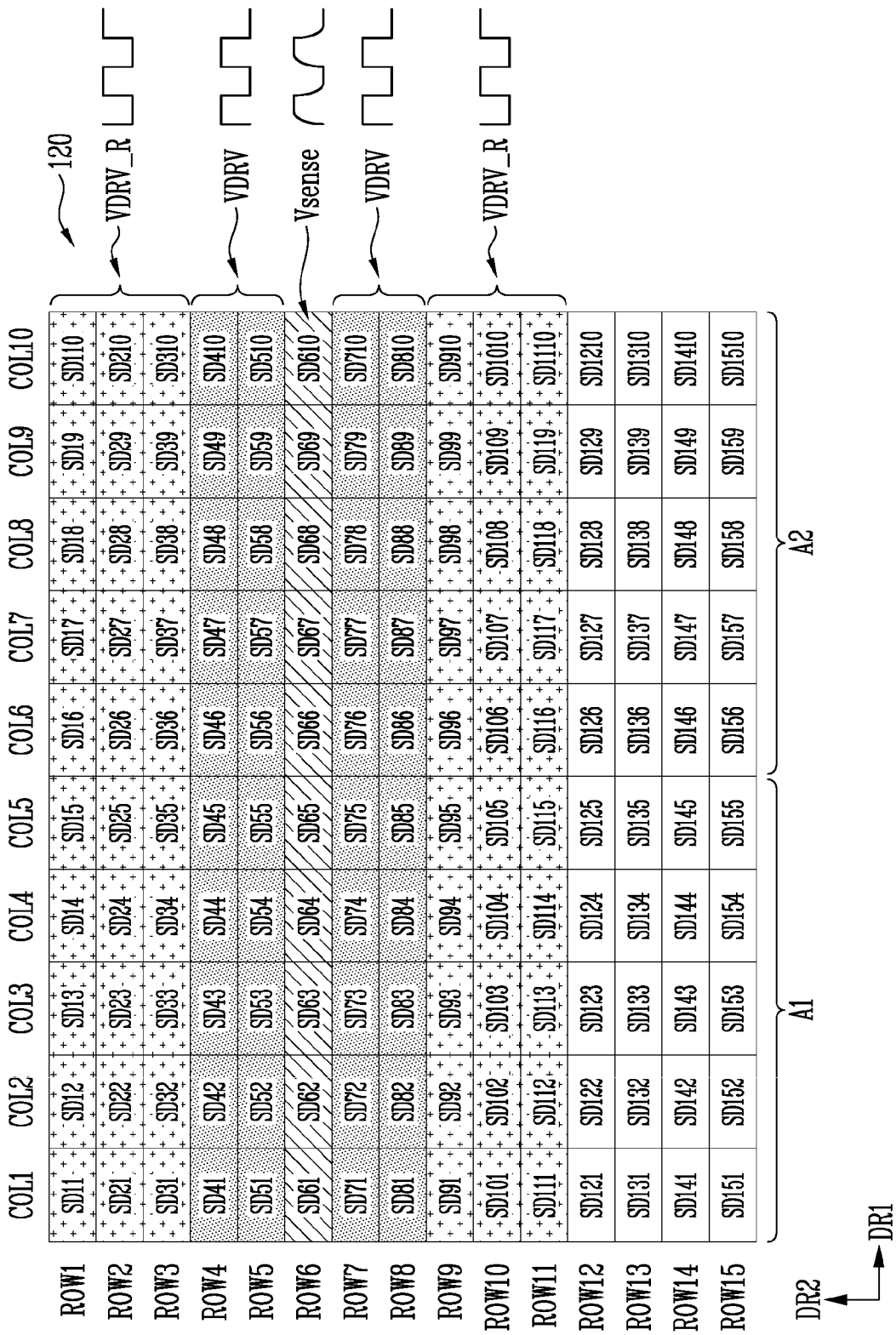
FIG. 13 is a diagram illustrating a comparative embodiment of the operation of the sensor device of FIG. 4.

FIG. 13 is a diagram illustrating a comparative embodiment of the operation of the sensor device of FIG. 4.

Referring to FIGS. 4 and 10 to 13, it may be assumed that the sensing operation is performed on the sensors SD61 to SD610 of the sixth row ROW6 in a specific period.

In order to improve the SNR of the sensing signal Vsense of the sensors SD61 to SD610 of the sixth row ROW6, the shield signal VDRV may be applied to the sensors SD41 to SD410, SD51 to SD510, SD71 to SD710, and SD81 to SD810 of the fourth, fifth, seventh, and eighth rows ROW4, ROW5, ROW7, and ROW8 adjacent to the sixth row ROW6.

In addition, in order to reduce the EMI caused by the shield signal VDRV, a reversed shield signal VDRV_R may be applied to the sensors SD11 to SD310 and SD91 to SD1110 of the first to third and ninth to eleventh rows ROW1 to ROW3 and ROW9 to ROW11. The reversed shield signal VDRV_R may be a signal in which a phase of the shield signal VDRV is reversed.

In this case, because the sensors SD11 to SD510 and SD71 to SD1110 of the first to fifth and seventh to eleventh rows ROW1 to ROW5 and ROW7 to ROW11 are required to be driven unnecessarily, power consumption may increase.

Therefore, the sensor device SSD according to embodiments of the disclosure may divide the sensor unit 120 into the first and second areas A1 and A2, perform the sensing operation on each of the first and second areas A1 and A2 by simultaneously using the first and second reference signals having mutually reverse phases, and improve the SNR of the first and second sensing signals Vsense1 and Vsense2 by simultaneously using the first and second shield signals VDRV1 and VDRV2 having mutually reverse phases. Therefore, the sensor device SSD may reduce a driving area of the sensor unit 120 and power consumption according thereto by half compared to the comparative embodiment while reducing EMI without performance reduction.

Figure 14:
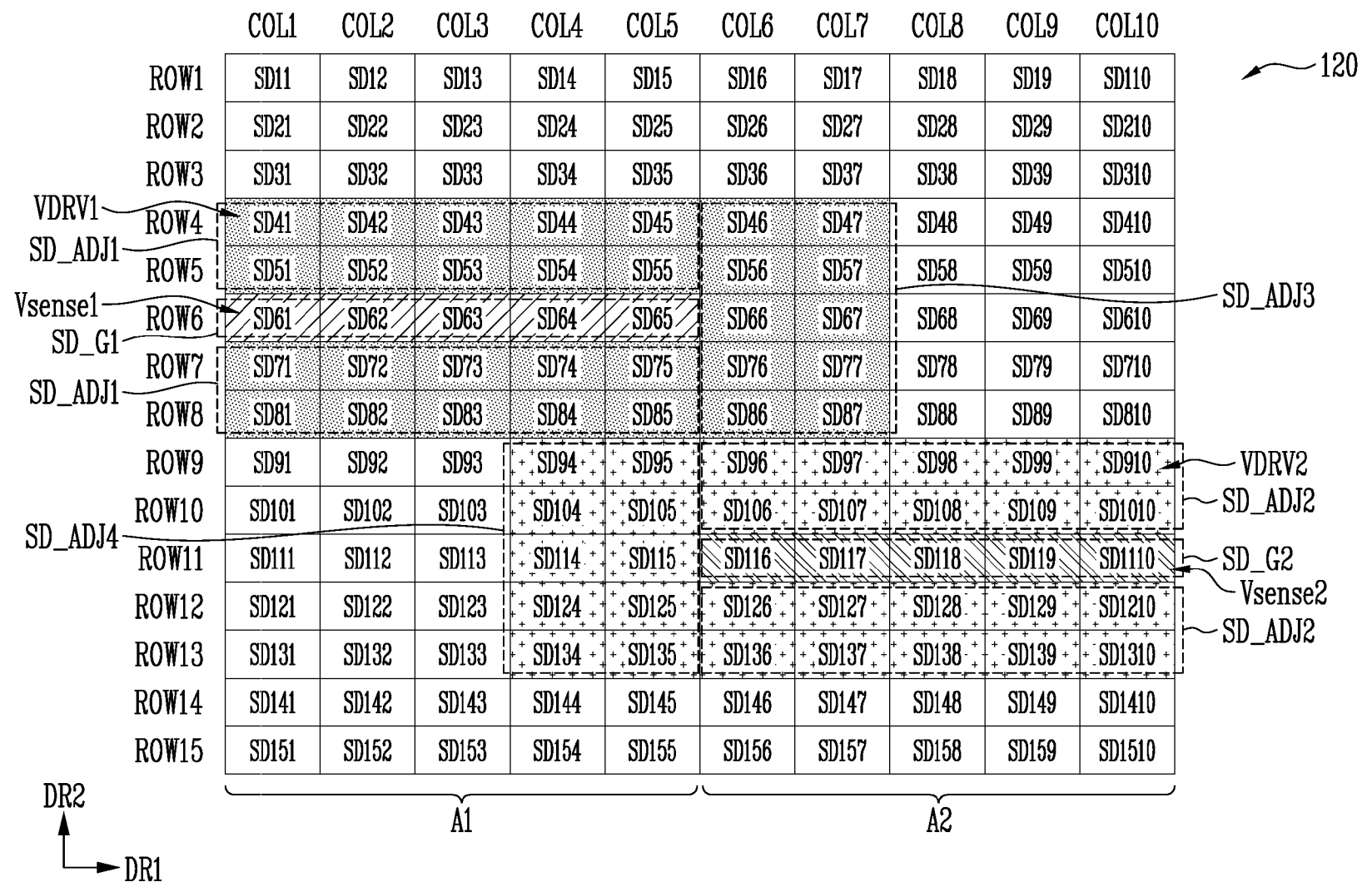

FIG. 14 is a diagram illustrating aspects of the operation of the sensor device of FIG. 4 according to some embodiments.

Referring to FIGS. 4, 12, and 14, except for third adjacent sensors SD_ADJ3 and fourth adjacent sensors SD_ADJ4, the embodiments of FIG. 14 may be substantially the same as or similar to the embodiments of FIG. 12. Therefore, some overlapping description may not be repeated.

The first shield signal VDRV1 may also be applied to the third adjacent sensors SD_ADJ3 adjacent to the first sensor group SD_G1, which is the sensing target of the first area A1, in a row direction. Here, the third adjacent sensors SD_ADJ3 may be sensors included in the same row as the first sensor group SD_G1 (and the first adjacent sensors SD_ADJ1) and adjacent to the first sensor group SD_G1 (and the first adjacent sensors SD_ADJ1) within at least one column.

For example, when the first sensor group SD_G1 includes the 61st to 65th sensors SD61 to SD65 of the sixth row ROW6, the third adjacent sensors SD_ADJ3 may include the 66-th sensor SD66 of the sixth row ROW6 adjacent to the first sensor group SD_G1 within one column. In addition, the third adjacent sensors SD_ADJ3 may include the 67th sensor SD67 of the sixth row ROW6 adjacent to the first sensor group SD_G1 within two columns. According to some embodiments, the third adjacent sensors SD_ADJ3 may include sensors SD46, SD47, SD56, SD57, SD76, SD77, SD86, and SD87 adjacent to the first adjacent sensors SD_ADJ1 within two columns.

When the first shield signal VDRV1 is applied to the third adjacent sensors SD_ADJ3 during a period in which sensing is performed on the first sensor group SD_G1 using the first reference signal Vref1, a capacitance between the first sensor group SD_G1 (and the first adjacent sensors SD_ADJ1) and the third adjacent sensors SD_ADJ3 may be substantially excluded, and the SNR of the first sensing signal Vsense1 may be improved. That is, an abnormal phenomenon (for example, a sensitivity decrease of the first sensing signal Vsense1) at a boundary portion of the first sensor group SD_G1 adjacent to the third adjacent sensors SD_ADJ3 may be reduced.

Meanwhile, in FIG. 14, the third adjacent sensors SD_ADJ3 include only sensors positioned on a right side of the first sensor group SD_G1, but the disclosure is not limited thereto. When a sensor also exists on a left side of the first sensor group SD_G1, the third adjacent sensors SD_ADJ3 may also include the sensor (refer to FIG. 17).

Similar to the third adjacent sensors SD_ADJ3, the second shield signal VDRV2 may also be applied to the fourth adjacent sensors SD_ADJ4 adjacent to the second sensor group SD_G2, which is the sensing target of the second area A2, in the row direction. Here, the fourth adjacent sensors SD_ADJ4 may be sensors included in the same row as the second sensor group SD_G2 (and the second adjacent sensors SD_ADJ2) and adjacent to the second sensor group SD_G2 (and the second adjacent sensors SD_ADJ2) within at least one column.

For example, when the second sensor group SD_G2 includes the 116th to 1110th sensors SD116 to SD1110 of the eleventh row ROW11, the fourth adjacent sensors SD_ADJ4 may include a 115th sensor SD115 and a 114th sensor SD114 of the eleventh row ROW11 adjacent to the second sensor group SD_G2 within two columns. According to some embodiments, the fourth adjacent sensors SD_ADJ4 may further include sensors S94, S95, S104, S105, S124, S125, S134, and S135 adjacent to the second adjacent sensors SD_ADJ2 within two columns.

When the second shield signal VDRV2 is applied to the fourth adjacent sensors SD_ADJ4 during a period in which sensing is performed on the second sensor group SD_G2 using the second reference signal Vref2, a capacitance between the second sensor group SD_G2 (and the second adjacent sensors SD_ADJ2) and the fourth adjacent sensors SD_ADJ4 may be substantially excluded, and the SNR of the second sensing signal Vsense2 may be improved.

Figure 15:
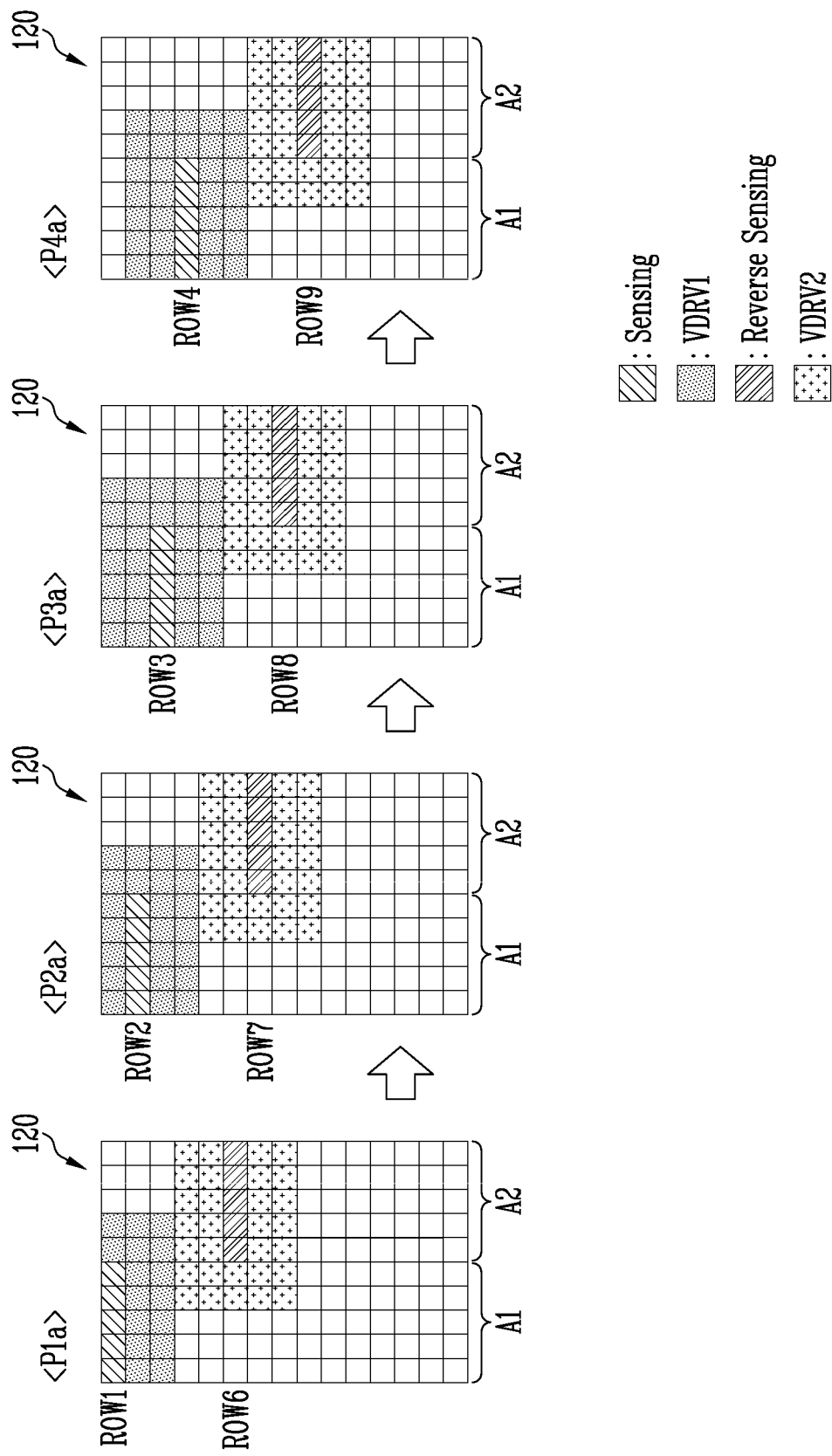
FIG. 15 is a diagram illustrating aspects of the operation of the sensor device of FIG. 4 according to some embodiments.

FIG. 15 is a diagram illustrating aspects of the operation of the sensor device of FIG. 4 according to some embodiments. FIG. 15 shows sensors (or an area) on which the sensing operation is performed based on the sensor unit 120 over time and sensors (or an area) to which the shield signals VDRV1 and VDRV2 are applied.

Referring to FIGS. 4, 14, and 15, the sensor unit 120 and a driving method of FIG. 15 may be substantially the same as the sensor unit 120 and a driving method of FIG. 14, respectively. Therefore, an overlapping description is not be repeated.

In embodiments, the sensor device SSD may sequentially sense (scan, or drive) the sensors along a column direction.

In a first period P1a, a sensing operation may be performed on sensors positioned in a first row ROW1 of the first area A1, and simultaneously, a reverse sensing operation may be performed on sensors positioned in the sixth row ROW6 of the second area A2. That is, the sensor device SSD may receive the first sensing signal from the sensors positioned in the first row ROW1 of the first area A1 using the first reference signal, and receive the second sensing signal from the sensors positioned in the sixth row ROW6 of the second area A2 using the second reference signal (or a reversed reference signal) in which the phase of the first reference signal is reversed. Hereinafter, the sensing operation using the second reference signal in which the phase of the first reference signal (that is, the first reference signal used for the sensing operation) is reversed is referred to as the reverse sensing operation.

Meanwhile, the first shield signal VDRV1 may be applied to sensors adjacent to the sensors positioned in the first row ROW1 of the first area A1 within two rows and two columns (that is, the first and third adjacent sensors SD_ADJ1 and SD_ADJ3, refer to FIG. 14), and the second shield signal VDRV2 may be applied to sensors adjacent to the sensors positioned in the sixth row ROW6 of the second area A2 within two rows and two columns (that is, the second and fourth adjacent sensors SD_ADJ1 and SD_ADJ3, refer to FIG. 14).

Thereafter, in a second period P2a, a sensing operation for sensors positioned in a second row ROW2 of the first area A1 and a reverse sensing operation for sensors positioned in the seventh row ROW7 of the second area A2 may be simultaneously performed. Meanwhile, the first shield signal VDRV1 may be applied to sensors adjacent to the sensors positioned in the second row ROW2 of the first area A1, and the second shield signal VDRV2 may be applied to sensors adjacent to the sensors positioned in the seventh row ROW7 of the second area A2.

Thereafter, in a third period P3a, a sensing operation for sensors positioned in a third row ROW3 of the first area A1 and a reverse sensing operation for sensors positioned in the eighth row ROW8 of the second area A2 may be simultaneously performed. Meanwhile, the first shield signal VDRV1 may be applied to sensors adjacent to the sensors positioned in the third row ROW3 of the first area A1, and the second shield signal VDRV2 may be applied to sensors adjacent to the sensors positioned in the eighth row ROW8 of the second area A2.

Thereafter, in a fourth period P4a, a sensing operation for sensors positioned in a fourth row ROW4 of the first area A1 and a reverse sensing operation for sensors positioned in the ninth row ROW9 of the second area A2 may be simultaneously performed. Meanwhile, the first shield signal VDRV1 may be applied to sensors adjacent to the sensors positioned in the fourth row ROW4 of the first area A1, and the second shield signal VDRV2 may be applied to sensors adjacent to the sensors positioned in the ninth row ROW9 of the second area A2.

In the above-described method, sensing operations for the entire sensors in the sensor unit 120 may be sequentially performed.

Meanwhile, a sequential sensing method (that is, a sequential scan of a row unit) according to the embodiments of FIG. 15 may also be applied to the embodiments of FIGS. 7, 9, and 10.

Figure 16:
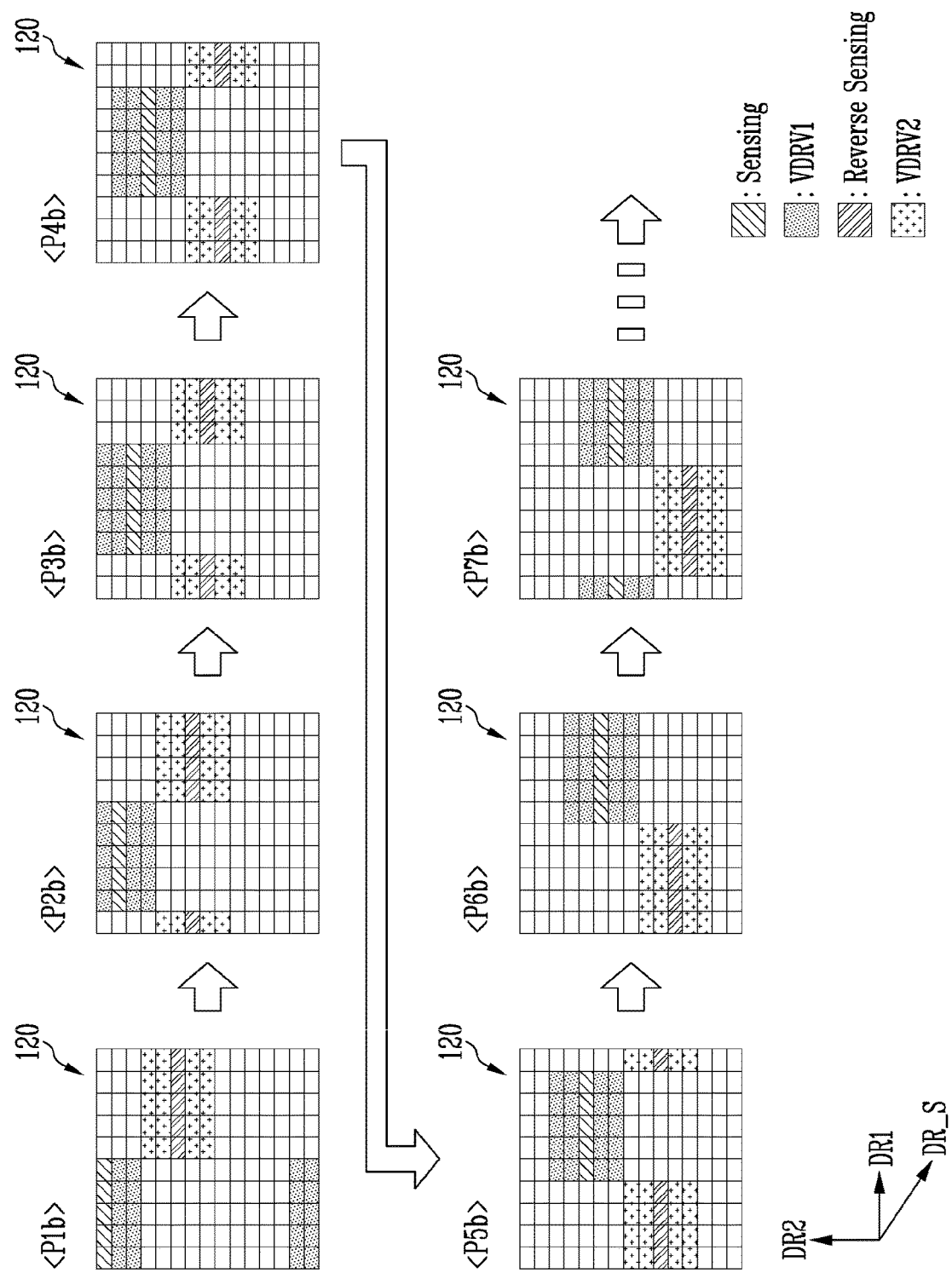
FIG. 16 is a diagram illustrating aspects of the operation of the sensor device of FIG. 4 according to some embodiments.

FIG. 16 is a diagram illustrating aspects of the operation of the sensor device of FIG. 4 according to some embodiments. FIG. 16 shows sensors (or an area) on which the sensing operation is performed based on the sensor unit 120 over time and sensors (or an area) to which the shield signals VDRV1 and VDRV2 are applied.

Referring to FIGS. 4, 12, and 16, the sensor unit 120 and a driving method of FIG. 16 may be substantially the same as the sensor unit 120 and the driving method of FIG. 12, respectively. Therefore, an overlapping description is not be repeated.

In embodiments, the sensor device SSD may sequentially sense (scan, or drive) the sensors along a diagonal direction DR_S (or an oblique direction) crossing the first and second directions DR1 and DR2 (or a row and a column).

In a first period P1b, a sensing operation for the 11th to 15th sensors of the first row ROW1 may be performed, and a reverse sensing operation for the 66th to 610th sensors of the sixth row may be performed. Meanwhile, the first shield signal VDRV1 may be applied to sensors adjacent to the 11th to 15th sensors of the first row ROW1 within two rows (that is, the first adjacent sensors SD_ADJ1, refer to FIG. 12), and the second shield signal VDRV2 may be applied to sensors adjacent to the 66th to 610th sensors of the sixth row within two rows (that is, the second adjacent sensors SD_ADJ2, refer to FIG. 12).

Thereafter, in a second period P2b, a sensing operation for the 22nd to 26th sensors of the second row ROW2 and a reverse sensing operation for the 77th to 710th sensors and the 71st sensor of the seventh row may be simultaneously performed. Meanwhile, the first shield signal VDRV1 and the second shield signal VDRV2 may be applied to sensors (that is, the first adjacent sensors and the second adjacent sensors) adjacent to the sensors, respectively.

Sensors on which the sensing operation and the reverse sensing operation are performed in a third period P3b, a fourth period P4b, a fifth period P5b, a sixth period P6b, and a seventh period P7b, and the sensors to which the first and second shield signals VDRV1 and VDRV2 are applied are as shown in FIG. 16, and a description thereof is omitted.

In the above-described method, sensing operations for the entire sensors in the sensor unit 120 may be sequentially performed.

As described with reference to FIGS. 12 and 14, an abnormal phenomenon (for example, a sensitivity decrease of the sensing signal) may occur in sensing target sensors positioned at an edge portion of the row direction, but the abnormal phenomenon may be reduced through the sequential sensing method in the diagonal direction DR_S according to some embodiments of FIG. 15.

Figure 17:
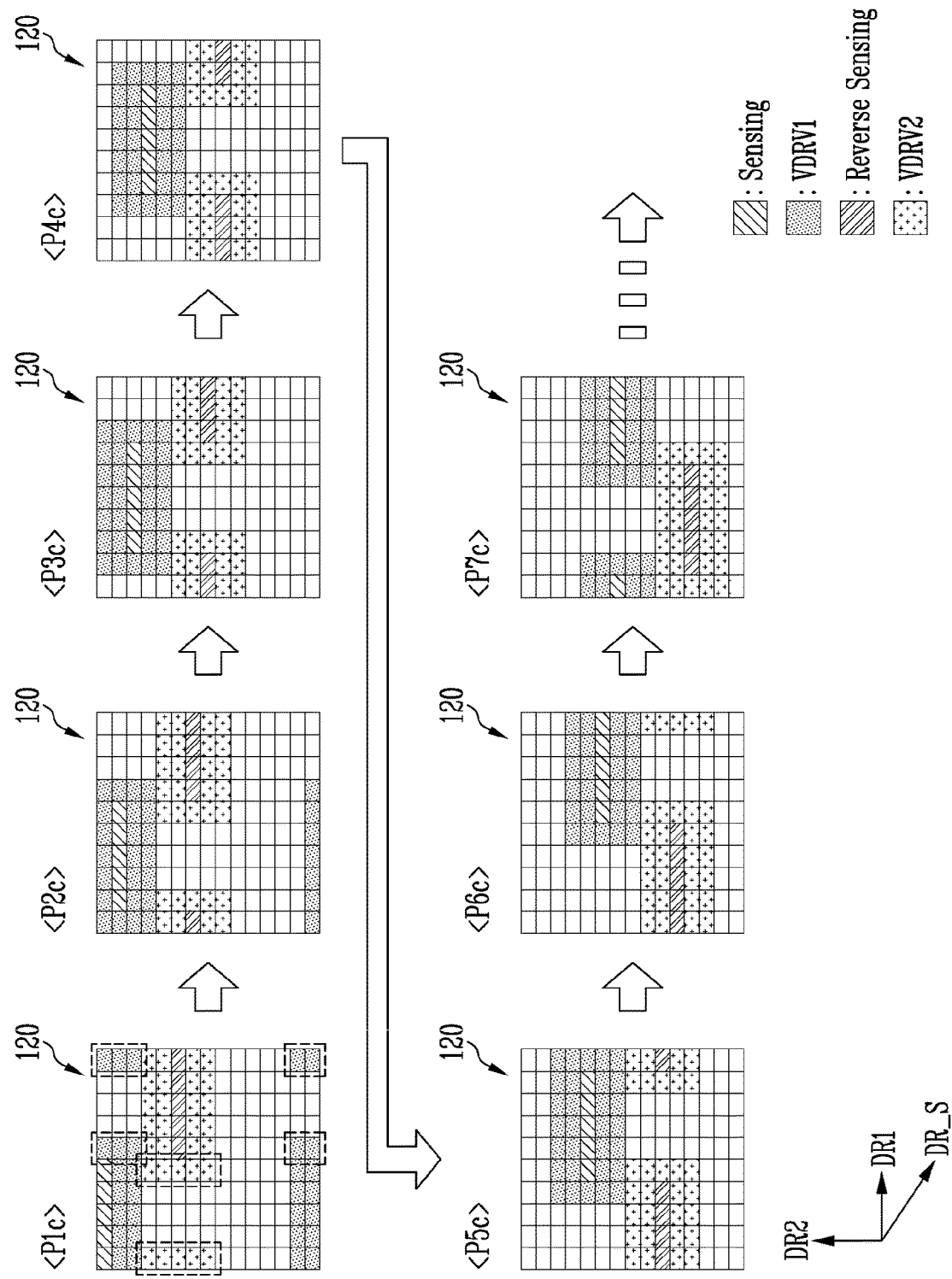
FIG. 17 is a diagram illustrating aspects of the operation of the sensor device of FIG. 4 according to some embodiments.

FIG. 17 is a diagram illustrating aspects of the operation of the sensor device of FIG. 4 according to some embodiments. FIG. 17 may correspond to FIG. 16.

Referring to FIGS. 4, 14, and 17, the sensor unit 120 and a driving method of FIG. 17 may be substantially the same as the sensor unit 120 and the driving method of FIG. 14, respectively. Therefore, an overlapping description is not be repeated. In addition, a sensing method of FIG. 17 may be substantially the same as or similar to the sequential sensing method of the diagonal direction DR_S of FIG. 16. That is, the sequential sensing method of the diagonal direction DR_S of FIG. 16 may also be applied to the embodiments of FIG. 14.

In a first period P1c, the sensing operation may be performed on the 11th to 15th sensors of the first row ROW1, and simultaneously, the reverse sensing operation may be performed on the 66th to 610th sensors of the sixth row. Meanwhile, the first shield signal VDRV1 may be applied to sensors adjacent to the 11th to 15th sensors of the first row ROW1 within two rows and one column (that is, the first and third adjacent sensors SD_ADJ1 and SD_ADJ3, refer to FIG. 14), and the second shield signal VDRV2 may be applied to sensors adjacent to the 66th to 610th sensors of the sixth row within two rows and two columns (that is, the second and fourth adjacent sensors SD_ADJ2 and SD_ADJ4, refer to FIG. 14).

Thereafter, in a second period P2c, the sensing operation for the 22nd to 26th sensors of the second row ROW2 and the reverse sensing operation for the 77th to 710th sensors and the 71st sensor of the seventh row may be simultaneously performed. Meanwhile, the first shield signal VDRV1 and the second shield signal VDRV2 may be applied to the sensors (that is, the first adjacent sensors and the second adjacent sensors) adjacent to the sensors, respectively.

Sensors on which the sensing operation and the reverse sensing operation are performed in a third period P3c, a fourth period P4c, a fifth period P5c, a sixth period P6c, and a seventh period P7c, and sensors to which the first and second shield signals VDRV1 and VDRV2 are applied are as shown in FIG. 17, and a description thereof is omitted.

In the above-described method, sensing operations for the entire sensors in the sensor unit 120 may be sequentially performed.

Figure 18:
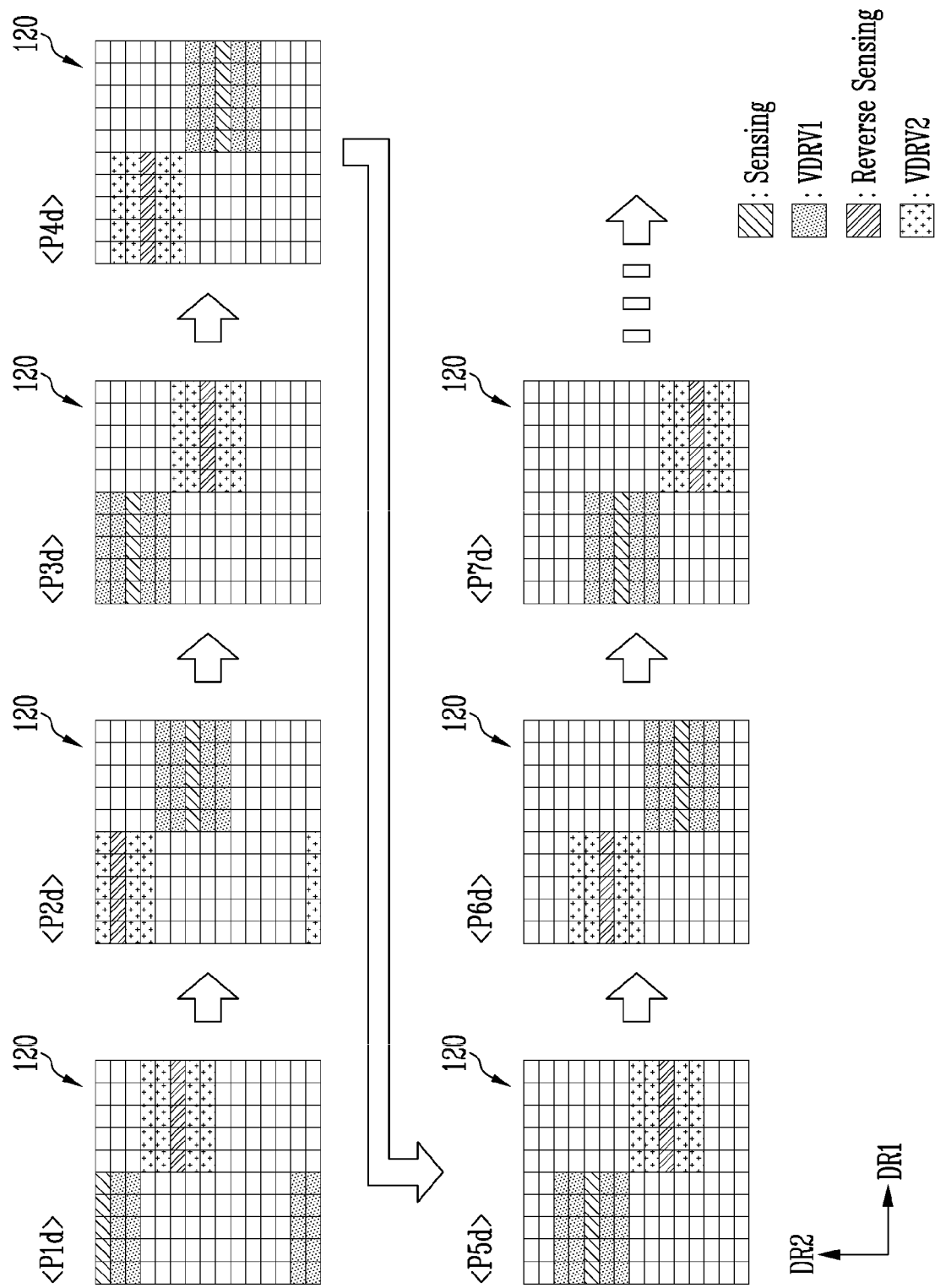
FIGS. 18 and 19 are diagrams illustrating aspects of the operation of the sensor device of FIG. 4 according to some embodiments.
Figure 19:
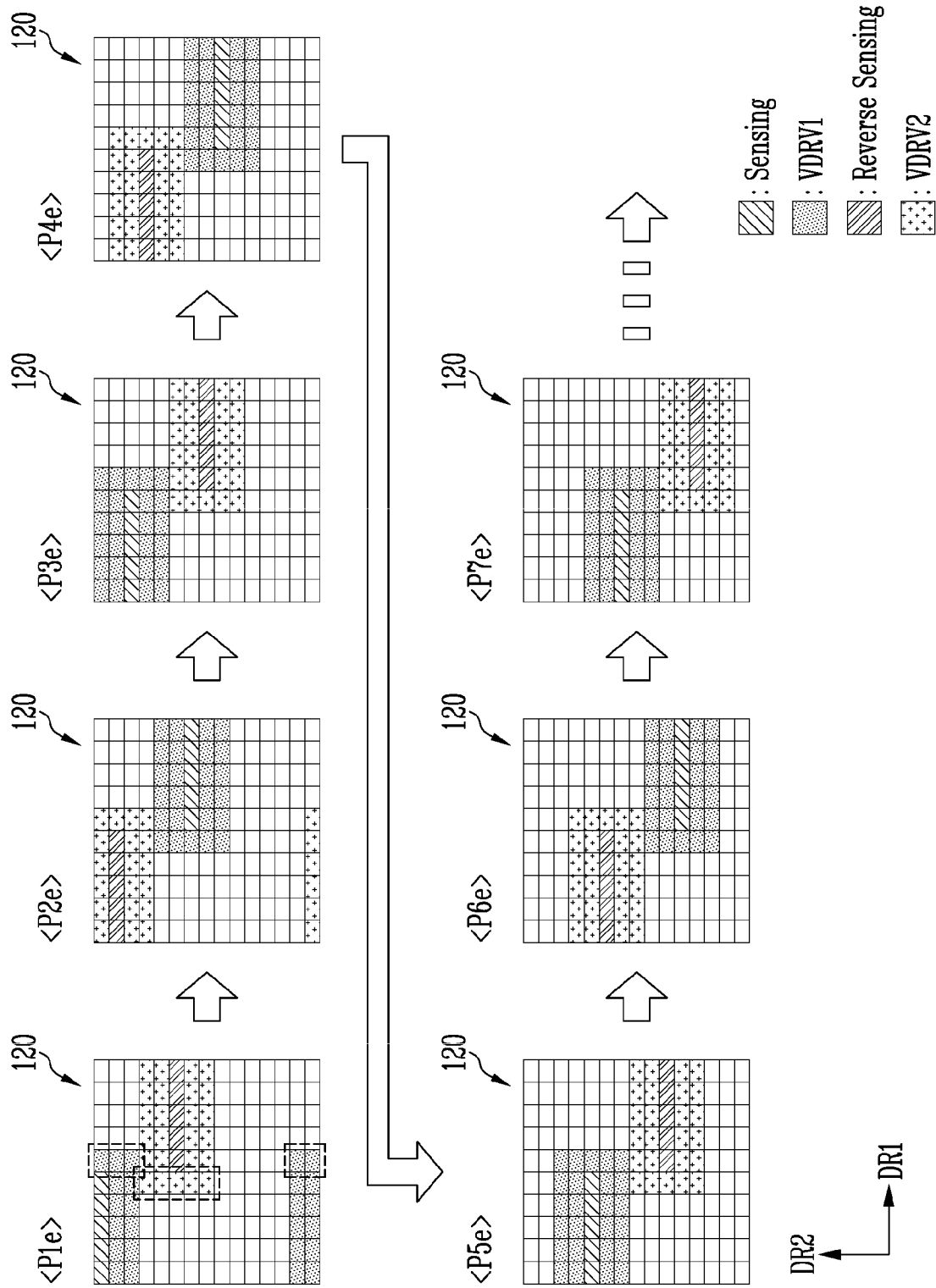

FIGS. 18 and 19 are diagrams illustrating aspects of the operation of the sensor device of FIG. 4 according to some embodiments. FIGS. 18 and 19 show sensors (or an area) to which the sensing operation is performed based on the sensor unit 120 over time and sensors (or an area) to which the shield signals VDRV1 and VDRV2 are applied. FIGS. 18 and 19 show other embodiments of the sensors to which the shield signals VDRV1 and VDRV2 are applied. However, because a difference between FIGS. 18 and 19 is described with reference to FIGS. 12 and 14, an overlapping description is not be repeated.

Referring to FIGS. 4, 15, 18, and 19, the sensor unit 120 in first to fourth periods P1d to P4d of FIG. 18 (and the sensor unit 120 in first to fourth periods P1e to P4e of FIG. 19) may correspond to the sensor unit 120 in the first to fourth periods P1a to P4a of FIG. 15.

In embodiments, the sensor device SSD may sequentially sense (scan, or drive) the sensors along the column direction. In addition, the sensor device SDD may reverse the reference signal and the shield signal applied to each area in every period. For example, the sensor device SSD may receive the sensing signals from the sensors in the row unit, receive the first sensing signals from sensors in an odd-numbered row using the first reference signal, and receive the second sensing signals from sensors in an even-numbered row using the second reference signal.

In the first periods P1d and P1e, the sensing operations for the 11st to 15th sensors of the first row ROW1 may be performed, and the reverse sensing operation for the 66th to 610th sensors of the sixth row may be performed. Meanwhile, the first shield signal VDRV1 may be applied to the sensors adjacent to the 11st to 15th sensors of the first row ROW1, and the second shield signal VDRV2 may be applied to the sensors adjacent to the 66th to 610th sensors of the sixth row.

Thereafter, in the second periods P2d and P2e, the reverse sensing operation (that is, the sensing operation using the second reference signal not the sensing operation using the first reference signal) for the 21st to 25th sensors of the second row ROW2 may be performed, and a sensing operation (that is, the sensing operation not the reverse sensing operation) for the 76th to 710th sensors of the seventh row may be performed. Meanwhile, the second shield signal VDRV2 not the first shield signal VDRV1 may be applied to sensors adjacent to the 21st to 25th sensors of the second row ROW2, and the first shield signal VDRV1 not the second shield signal VDRV2 may be applied to the 76th to 710th sensors of the seventh row. That is, in the second periods P2d and P2e, the sensor unit 120 may be driven using signals reversed based on signals used in the first periods P1d and P1e (or signals used in the second period P2a of FIG. 15).

Thereafter, in the third periods P3d and P3e, similarly to an operation of the first period P1d, a sensing operation for the 31st to 35th sensors of the third row ROW3 may be performed, and a reverse sensing operation for the 86th to 810th sensors of the eighth row may be performed. Meanwhile, the first shield signal VDRV1 may be applied to sensors adjacent to the 31st to 35th sensors of the third row ROW3, and the second shield signal VDRV2 may be applied to the 86th to 810th sensors of the eighth row. That is, in the third periods P3d and P3e, the sensor unit 120 may be driven using signals reversed based on signals used in the second period P2d (or using signals used in the first periods P1d and P1e).

Thereafter, in the fourth periods P4d and P4e, similarly to an operation in the second period P2d, a reverse sensing operation for the 41st to 45th sensors of the fourth row ROW4 may be performed, and a sensing operation (that is, the sensing operation not the reverse sensing operation) for the 96th to 910th sensors of the ninth row may be performed. Meanwhile, the second shield signal VDRV2 not the first shield signal VDRV1 may be applied to sensors adjacent to the 41st to 45th sensors of the fourth row ROW4, and the first shield signal VDRV1 not the second shield signal VDRV2 may be applied to the 96th to 910th sensors of the ninth row. That is, in the fourth periods P4d and P4e, the sensor unit 120 may be driven using signals reversed based on signals used in the third periods P3d and P3e.

Sensors on which the sensing operation and the reverse sensing operation are performed and sensors to which the first and second shield signals VDRV1 and VDRV2 are applied in fifth periods P5d and P5e, sixth periods P6d, P6e, and seventh periods P7d and P7e are as shown in FIGS. 18 and 19, and a description thereof is omitted.

In the above-described method, sensing operations for the entire sensors in the sensor unit 120 may be sequentially performed.

Meanwhile, a line reverse driving method according to the embodiments of FIGS. 18 and 19 may also be applied to the embodiments of FIGS. 7, 9, and 10.

Figure 20:
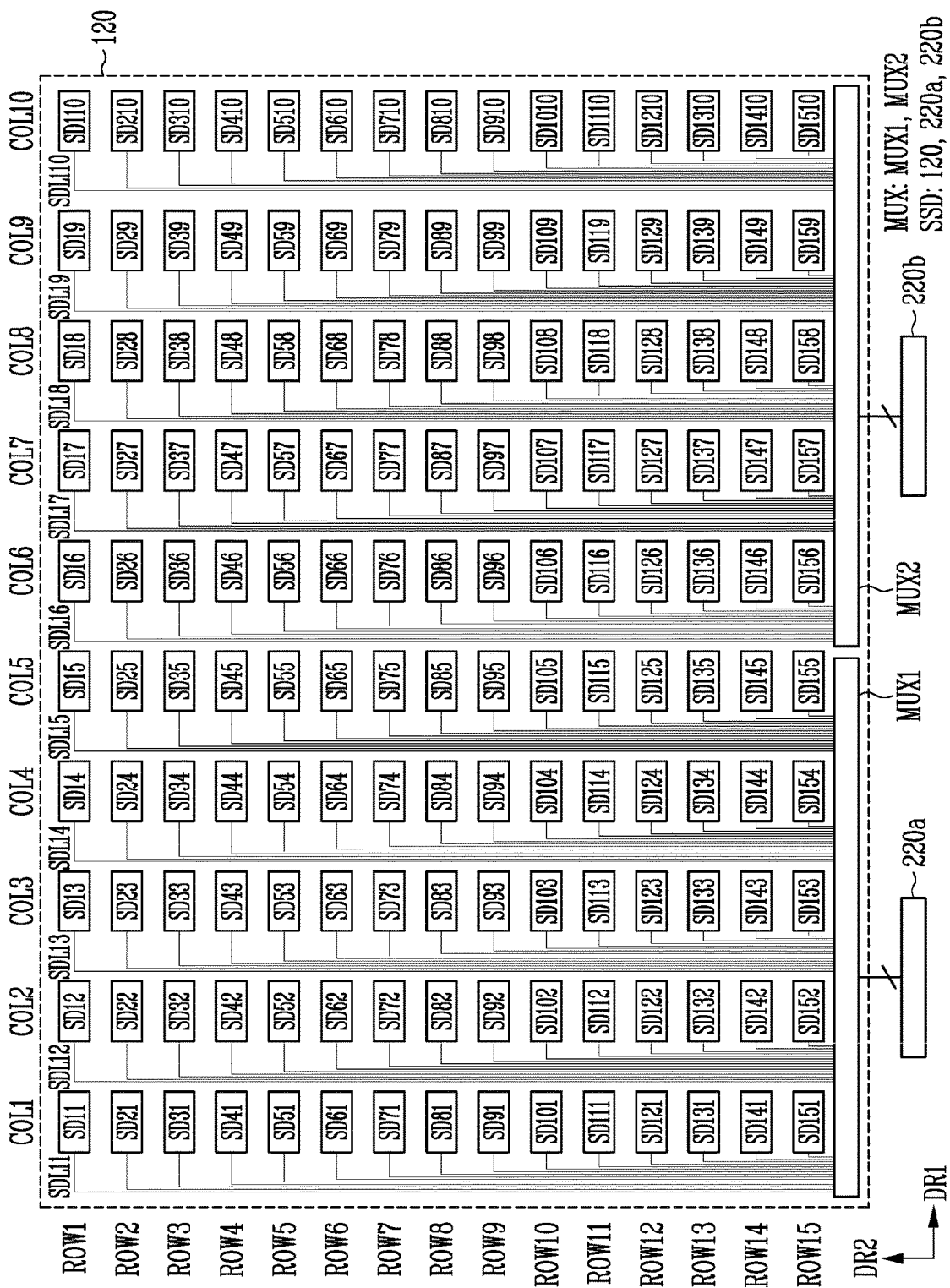
FIG. 20 is a diagram illustrating aspects of the sensor device included in the display device of FIG. 1 according to some embodiments.
Figure 21:
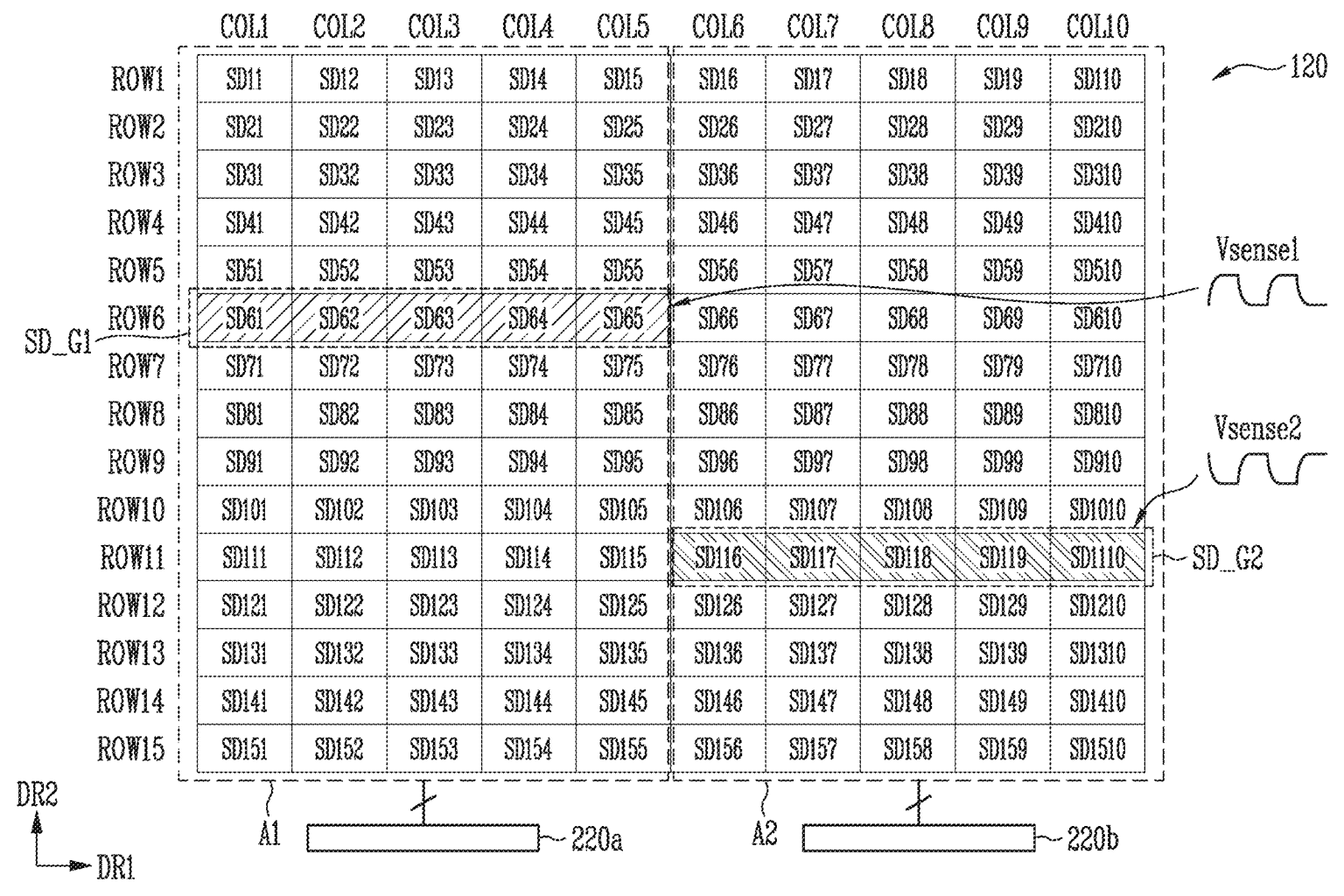
Figure 22:
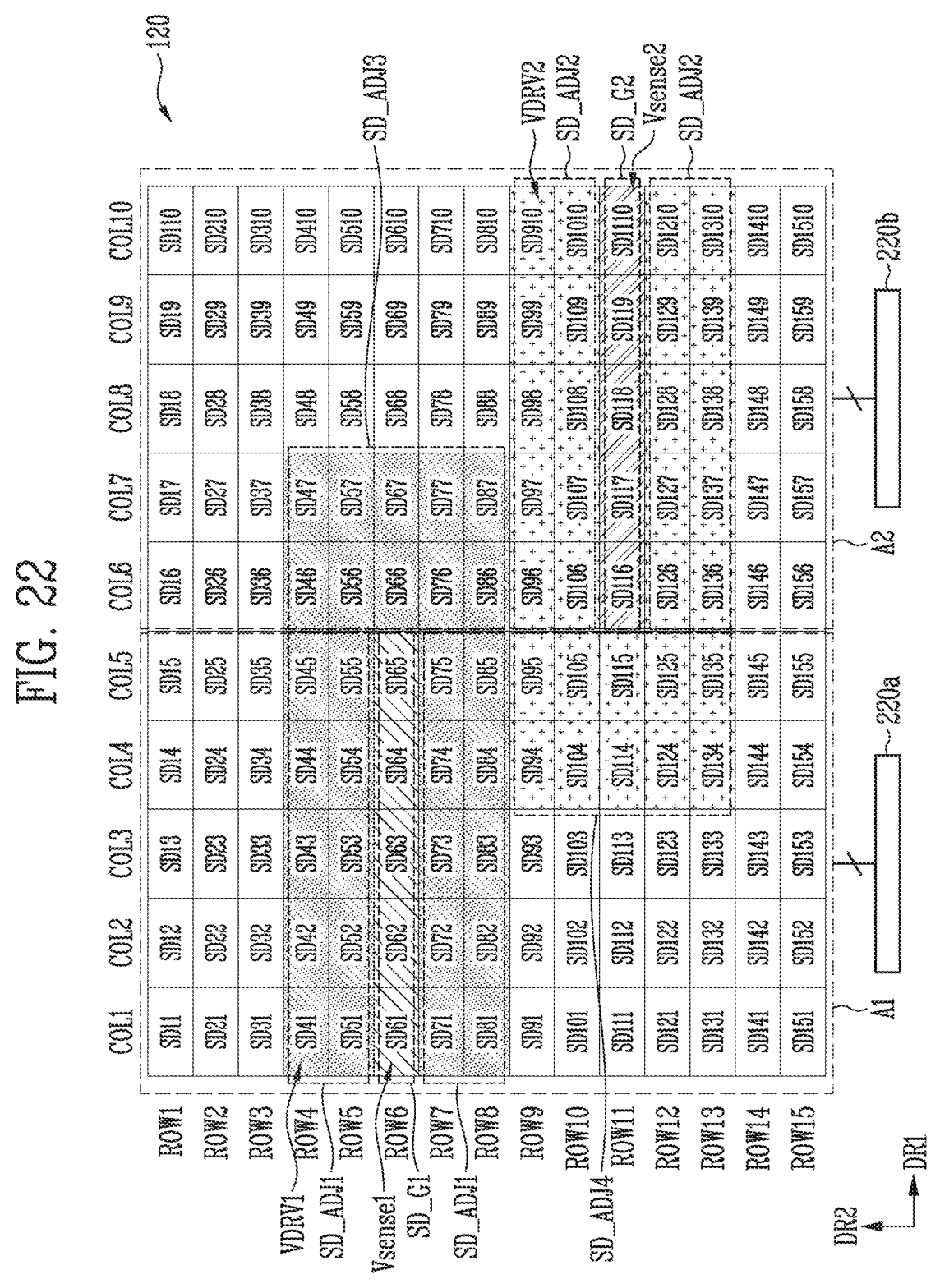

FIG. 20 is a diagram illustrating aspects of the sensor device included in the display device of FIG. 1 according to some embodiments. FIG. 21 is a diagram illustrating aspects of an operation of the sensor device of FIG. 20 according to some embodiments. FIG. 22 is a diagram illustrating aspects of the operation of the sensor device of FIG. 20 according to some embodiments. For convenience of description, the multiplexer MUX is omitted in FIGS. 21 and 22.

Referring to FIGS. 1, 4, 9, 14, and 20 to 22, except for a first sensor driver 220a and a second sensor driver 220b, the sensor device SSD of FIG. 20 may be substantially the same as or similar to the sensor device SSD of FIG. 4. In addition, the operations of the sensor device SSD of FIGS. 21 and 22 may be substantially the same as or similar to those of the sensor device SSD of FIGS. 9 and 14, respectively. Therefore, an overlapping description is not be repeated.

The multiplexer MUX may include a first multiplexer MUX1 and a second multiplexer MUX2.

The first multiplexer MUX1 may be electrically connected to the sensor lines SDL11 to SDL15, . . . corresponding to first to the fifth columns COL1 to COL5 (or a first area A1, refer to FIG. 21). In addition, the first multiplexer MUX1 may be electrically connected to the first sensor driver 220a. The first multiplexer MUX1 may select at least one of the sensor lines SDL11 to SDL15, . . . and electrically connect the selected at least one to the first sensor driver 220a.

The second multiplexer MUX2 may be electrically connected to the sensor lines SDL16 to SDL110, . . . corresponding to the sixth to tenth columns COL6 to COL10 (or a second area A2, refer to FIG. 21). In addition, the second multiplexer MUX2 may be electrically connected to the second sensor driver 220b. The second multiplexer MUX2 may select at least one of the sensor lines SDL16 to SDL110, . . . and electrically connect the selected at least one to the second sensor driver 220b.

The first sensor driver 220a may apply the first reference voltage (refer to "Vref1" of FIG. 8A) to sensors corresponding to the first to fifth columns COL1 to COL5, sense a change of a capacitance of the sensors, and determine presence or absence of the external input (or a position of the external input) in the first area A1 (refer to FIG. 21) corresponding to the first to fifth columns COL1 to COL5.

The second sensor driver 220b may apply the second reference voltage (refer to "Vref2" of FIG. 8A) to sensors corresponding to the sixth to tenth columns COL6 to COL10, sense a change of a capacitance of the sensors, and determine presence or absence of the external input in the second area A2 (refer to FIG. 21) corresponding to the sixth to tenth columns COL6 to COL10.

Referring to FIGS. 9 and 21, each of the first sensor driver 220a and the second sensor driver 220b may perform the sensing operation in one row unit. The first sensor driver 220a and the second sensor driver 220b may be driven independently of each other.

For example, the first sensor driver 220a may perform the sensing operation using the first reference signal Vref1 (refer to FIG. 8A) on the 61st to 65th sensors SD61 to SD65 (or the first sensor group SD_G1) of the sixth row ROW6 of the first area A1, and receive the first sensing signal Vsense1 from each of the 61st to 65th sensors SD61 to SD65. Simultaneously, the second sensor driver 220b may perform the sensing operation using the second reference signal Vref2 (refer to FIG. 8A) on the 116th to 1110th sensors SD116 to SD1110 (or the second sensor group SD_G2) of the eleventh row ROW11 of the second area A2, and receive the second sensing signal Vsense2 from each of the 116th to 1110th sensors SD116 to SD1110.

In a case of the embodiments of FIG. 9, the sensor driver 220 (refer to FIG. 4) is required to be configured or changed to drive different rows for each area. On the other hand, in a case of the embodiments of FIG. 21, because the first sensor driver 220a performs the sensing operation on only sensors of one row in the first area A1, a change of the first sensor driver 220a may not be required. Similarly, because the second sensor driver 220b performs the sensing operation on only sensors one row in the second area A2, a change of the second sensor driver 220b may not be required.

For example, when the sensor unit 120 (or the display device 1 (refer to FIG. 1)) is implemented with a large area, the sensor device SSD may include a plurality of sensor drivers, the first and second reference voltages (for example, the first and second reference voltages Vref1 and Vref2 of FIG. 8A) may be supplied to the sensor drivers or the sensor drivers may use the first and second reference voltages, to reduce EMI without a separate offset signal.

Referring to FIGS. 14 and 22, the first sensor driver 220a may apply the first shield signal VDRV1 to the first adjacent sensors SD_ADJ1 adjacent to the first sensor group SD_G1 which is the sensing target. According to some embodiments, the first sensor driver 220a may further apply the second shield signal VDRV2 to the fourth adjacent sensors SD_ADJ4 adjacent to the second sensor group SD_G2 (and the second adjacent sensors SD_ADJ2).

Similarly, the second sensor driver 220b may apply the second shield signal VDRV2 to the second adjacent sensors SD_ADJ2 adjacent to the second sensor group SD_G2 which is the sensing target. According to some embodiments, the second sensor driver 220b may further apply the first shield signal VDRV1 to the third adjacent sensors SD_ADJ3 adjacent to the first sensor group SD_G1 (and the first adjacent sensors SD_ADJ1).

Meanwhile, the embodiments of FIGS. 7, 10, 12, 15, 18, and 19 may also be applied to the embodiments of FIG. 20. According to some embodiments, the embodiments of FIGS. 16 and 17 may also be applied to the embodiments of FIG. 20.

Although the technical spirit of the disclosure has been described in more detail in accordance with the above-described embodiments, it should be noted that the above-described embodiments are for the purpose of description and not of limitation. In addition, those skilled in the art may understand that various modifications are possible within the scope of the technical spirit of the disclosure.

The scope of embodiments according to the present disclosure is not limited to the details described in the detailed description of the specification, but should be defined by the claims, and their equivalents. In addition, it is to be construed that all changes or modifications derived from the meaning and scope of the claims and equivalent concepts thereof are included in the scope of the disclosure.

What is claimed is:

1. A sensor device comprising:
  a sensor panel including sensors arranged in a matrix form and sensor lines electrically connected to the sensors one-to-one; and
  a sensor driver configured to receive sensing signals from the sensors through the sensor lines,
  wherein the sensor driver is configured to simultaneously receive a first sensing signal from a first sensor using a first reference signal and a second sensing signal from a second sensor using a second reference signal,
  wherein the first reference signal and the second reference signal have a same waveform, a phase of the second reference signal is different from a phase of the first reference signal, and
  wherein a phase of the second sensing signal is different from a phase of the first sensing signal.

2. The sensor device according to claim 1, wherein the first reference signal and the second reference signal are square waves,
  wherein the phase of the second reference signal is opposite the phase of the first reference signal, and
  wherein the phase of the second sensing signal is opposite to the phase of the first sensing signal.

3. The sensor device according to claim 1, wherein the sensor panel is divided into a first area in which the first sensor is positioned and a second area in which the second sensor is positioned, and
  wherein the sensor driver is configured to receive the sensing signals from the sensors of the first area using the first reference signal, and to receive the sensing signals from the sensors of the second area using the second reference signal.

4. The sensor device according to claim 3, wherein the sensor driver is configured to receive the sensing signals from the sensors in a row unit for each area.

5. The sensor device according to claim 4, wherein the first area and the second area are divided based on a specific column.

6. The sensor device according to claim 5, wherein based on the sensor driver receiving the first and second sensing signals from the first and second sensors, the second reference signal is not applied to the sensors of the first area, and the first reference signal is not applied to the sensors of the second area.

7. The sensor device according to claim 4, wherein the first sensor and the second sensor are included in a same row.

8. The sensor device according to claim 4, wherein the first sensor and the second sensor are included in different rows.

9. The sensor device according to claim 1, wherein the sensor driver comprises:
   an amplifier including a first input terminal electrically connected to one sensor line among the sensor lines, a second input terminal to which the first reference signal or the second reference signal is applied, and an output terminal; and
   a capacitor and a switch electrically connected in parallel between the first input terminal and the output terminal of the amplifier, and
   wherein a sensing signal according to the first reference signal or the second reference signal is generated in the one sensor line among the sensor lines.

10. The sensor device according to claim 1, wherein the sensors include at least one first adjacent sensor included in a same column as the first sensor and adjacent to the first sensor,
   the sensor driver is configured to apply a third reference signal to the at least one first adjacent sensor based on the first sensing signal being received, and
   the third reference signal has a same phase as the first reference signal.

11. The sensor device according to claim 10, wherein the sensors include at least one second adjacent sensor included in a same column as the second sensor and adjacent to the second sensor,
   the sensor driver is configured to apply a fourth reference signal to the at least one second adjacent sensor based on the second sensing signal being received, and
   the fourth reference signal has a same phase as the second reference signal.

12. The sensor device according to claim 11, wherein the first sensor, the second sensor, the at least one first adjacent sensor, and the at least one second adjacent sensor are included in rows different from each other.

13. The sensor device according to claim 11, wherein the sensor driver is configured to sequentially scan the sensors along a diagonal direction crossing a row direction and a column direction.

14. The sensor device according to claim 10, wherein the sensors further include at least one third adjacent sensor included in a same row as the first sensor and adjacent to the first sensor, and
   the sensor driver is configured to apply the third reference signal to the at least one third adjacent sensor based on the first sensing signal being received.

15. The sensor device according to claim 14, wherein the sensor driver is configured to sequentially scan the sensors along a diagonal direction crossing a row direction and a column direction.

16. The sensor device according to claim 10, wherein the sensor driver is configured to receive the sensing signals from the sensors in a row unit for each area.

17. The sensor device according to claim 1, wherein the sensor driver is configured to receive the sensing signals from the sensors in a row unit, to receive the sensing signals from the sensors of an odd-numbered row using the first reference signal, and to receive the sensing signals from the sensors of an even-numbered row using the second reference signal.

18. A display device comprising:
   a display panel configured to display an image;
   a sensor panel at least partially overlapping the display panel, and including sensors arranged in a matrix form, and sensor lines electrically connected to the sensors one-to-one; and
   a sensor driver configured to receive sensing signals from the sensors through the sensor lines,
   wherein the sensor driver is configured to simultaneously receive a first sensing signal from a first sensor using a first reference signal and a second sensing signal from a second sensor using a second reference signal,
   the first reference signal and the second reference signal have a same waveform, a phase of the second reference signal is different from a phase of the first reference signal, and
   a phase of the second sensing signal is different from a phase of the first sensing signal.

19. An electronic device comprising:
   a processor providing data including grayscales;
   a display device configured to display an image based on the data; and
   a sensor device including sensors arranged in a matrix form, sensor lines electrically connected to the sensors one-to-one, and a sensor driver configured to receive sensing signals from the sensors through the sensor lines,
   wherein the sensor driver is configured to simultaneously receive a first sensing signal from a first sensor using a first reference signal and a second sensing signal from a second sensor using a second reference signal,
   wherein the first reference signal and the second reference signal have a same waveform, a phase of the second reference signal is different from a phase of the first reference signal, and
   wherein a phase of the second sensing signal is different from a phase of the first sensing signal.

20. The electronic device of claim 19, wherein the electronic device is one among a computer, a laptop computer, a cellular phone, a smart phone, a personal digital assistant (PDA), a portable multimedia player (PMP), a digital TV, a digital camera, a portable game console, a navigation device, a wearable device, an internet of things (IoT) device, an internet of everything (IoE) device, an e-book, a virtual reality (VR) device, an augmented reality (AR) device, a vehicle navigation system, a video phone, a surveillance system, an automatic focus system, a tracking system, or a motion sensing system.

* * * * *